United States Patent
Emtman et al.

(10) Patent No.: US 7,515,280 B2
(45) Date of Patent: Apr. 7, 2009

(54) DISPLACEMENT TRANSDUCER WITH SELECTABLE DETECTOR AREA

(75) Inventors: Casey Edward Emtman, Woodinville, WA (US); Andrew Michael Patzwald, Kirkland, WA (US); Benjamin Keith Jones, Seattle, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/593,574

(22) PCT Filed: May 12, 2004

(86) PCT No.: PCT/US2004/014705

§ 371 (c)(1),
(2), (4) Date: Oct. 11, 2006

(87) PCT Pub. No.: WO2005/114100

PCT Pub. Date: Dec. 1, 2005

(65) Prior Publication Data

US 2007/0146729 A1    Jun. 28, 2007

(51) Int. Cl.
*G01B 11/14* (2006.01)

(52) U.S. Cl. .................................. 356/614; 356/622

(58) Field of Classification Search ................. 356/486, 356/493, 496, 498, 614, 622; 365/512
See application file for complete search history.

(56) References Cited

U.S. PATENT DOCUMENTS

| 3,592,545 A | 7/1971 | Silver |
| 5,757,473 A | 5/1998 | Okanduth et al. |
| 2003/0019933 A1* | 1/2003 | Tsikos et al. ................. 235/454 |
| 2003/0026457 A1 | 2/2003 | Nahum |

FOREIGN PATENT DOCUMENTS

EP    1 262 738 A1    12/2002

* cited by examiner

*Primary Examiner*—Tarifur Chowdhury
*Assistant Examiner*—Michael Lapage
(74) *Attorney, Agent, or Firm*—Oliff & Berridge, PLC

(57) ABSTRACT

A displacement measurement device has a detector area which is larger than the area of the beam spot reflected from the measurement surface. The detector area is made larger than the size of the beam spot on the detector area, in order to accommodate shifts in the location of the beam spot due to changes in the precise locations of the components of the displacement measurement device. The subset of pixels in the detector area having advantageous correlation characteristics, is then selected to perform the correlation calculation, thereby reducing data processing time requirements.

16 Claims, 21 Drawing Sheets

US 7,515,280 B2

DISPLACEMENT TRANSDUCER WITH SELECTABLE DETECTOR AREA

BACKGROUND OF THE INVENTION

1. Field of Invention

This invention is directed to correlation displacement transducers. In particular, this invention is directed to a correlation displacement transducer having a selectable detector area.

2. Description of Related Art

Various known measurement transducers use images acquired by a sensor array, and correlation between images acquired by the sensor array, to determine deformations and/or displacements. For example, one class of such devices is based on acquiring a speckle image generated by illuminating an optically rough surface with a light source. The light source may be a coherent light source, such as a laser-generating light source. Such laser-generating light sources include a laser, laser diode and the like. After the optically rough surface is illuminated by the light source, the light scattered from the optically rough surface is imaged onto an optical sensor. The optical sensor can be a charge-coupled device (CCD), a semiconductor image sensor array, such as a CMOS image sensor array, or the like.

Prior to displacing or deforming the optically rough surface, a first initial speckle image, sometimes called a reference image, is captured and stored. Then, after displacing or deforming the optically rough surface, a second or subsequent speckle image, sometimes called a current image, is captured and stored. Conventionally, as much of the first and second speckle images as possible are then correlated or compared on a pixel-by-pixel basis. In general, a plurality of comparisons are performed. In each comparison, the first and second speckle images are offset, or spatially translated, relative to each other. Between each comparison, the amount of offset, or spatial translation, is increased by a known amount, such as one image element, or pixel, or an integer number of image elements or pixels.

In each correlation or comparison, the image value of a particular pixel in the reference image is multiplied by, subtracted from, or otherwise mathematically used in a function with, the image value of the corresponding second image pixel, where the corresponding second image pixel is determined based on the amount of offset. The value resulting from each pixel-by-pixel operation is accumulated with values resulting from the operation performed on every other pixel of the images to determine a correlation value for that comparison between the first and second images. That correlation value is then, in effect, plotted against the offset amount, or spatial translation position, for that comparison, to determine a correlation function value point. The offset amount, or spatial translation position, having the strongest correlation between the reference and first images will generate an extremum, that is, a peak, or a trough, depending on how the pixel-by-pixel comparison is performed, in the plot of correlation function value points. The offset amount, or spatial translation position, corresponding to the peak or trough represents the amount of relative displacement or deformation between the first and second speckle images.

Similarly, conventional images may be used in image correlation displacement sensing system systems. For such applications, the light source may be an incoherent source, such as a light emitting diode (LED), and the scale or surface to be imaged is located at the object-side focal plane of the imaging optics used to image the pattern of the scale or surface onto the optical sensor of the correlation displacement transducer.

SUMMARY OF THE DISCLOSURE

In either a displacement measuring transducer using a speckle pattern image, or a displacement measuring transducer using a conventional image of a scale or surface, it has been conventional to completely fill the imaging area of the optical sensor, i.e., the detector array, with the image and to output or "acquire" all pixels of the imaging area of the optical sensor for use, or potential use, in the correlation image processing operations. In general, this maximizes the amount of information delivered to the correlation circuits the achievable signal-to-noise ratio, and the potential subpixel interpolation accuracy of the resulting displacement measurement. However, the inventors have determined that this obvious and conventional, approach to system design fails to consider several important system problems that occur in the design and operation of a practical product. For example, this conventional approach may lead to disadvantageous requirements on various assembly tolerances and/or the allowable tolerances when mounting such displacement measuring sensors in the field. Furthermore, outputting or "acquiring" all pixels of the imaging area of the optical sensor generally decreases the rate at which correlation image acquisition and measurement can be performed, and as a result, generally decreases the displacement speed that is allowable with the associated displacement measuring sensor, thus limiting its utility and/or performance in various applications.

According to one aspect of this invention, a subset of light-sensitive pixels or elements, called the pixel address window, may be output or acquired from the detector array to potentially participate in the correlation calculation. When the number of output pixels potentially participating in the correlation calculation are reduced to a "minimum" number that is safely compatible with the desired resolution of the measurement system, the measurement rate of the device can be improved. Furthermore, a relatively more uniform intensity may generally be achieved over the area included in the pixel address window, which tends to increase the accuracy of the correlation operations used for displacement measurement. A size of the pixel address window may be determined that is appropriate for a given set of measurement requirements, sensor design constraints, and mounting tolerance requirements.

According to another aspect of the invention, during a "calibration" or setup procedure, a surface or scale portion may be imaged onto the entire detector array, and the output of all of the elements of the detector array may be measured. The subset of pixels in the area of the detector having the best or sufficient output characteristics with respect to providing an accurate correlation measurement, may be determined and selected as the operative pixel address window.

In accordance with another aspect of the invention, the "pixel correlation area" may be identified as an area smaller than the pixel address window, which defines a number of pixel elements that will overlap in two successive correlation images and participate in the correlation calculation. The correlation calculation may be performed using the output from the pixels in the correlation area, and the peak of the resulting correlation value curve may be located with subpixel precision to give a high resolution interpolated displacement measurement.

The resolution and range required of a measurement may affect the choice of the size of the pixel address window and the pixel correlation area. The tolerances associated with the field mounting of the displacement measuring sensor may affect the choice of the size of the detector array.

BRIEF DESCRIPTION OF THE DRAWINGS

Various exemplary embodiments of the systems and methods of this invention will be described in detail, with reference to the following figures, wherein:

FIG. 10b shows a pixel address window according to this invention chosen within the speckle image of FIG. 10a;

DETAILED DESCRIPTION OF EXEMPLARY EMBODIMENTS

Figure 1:
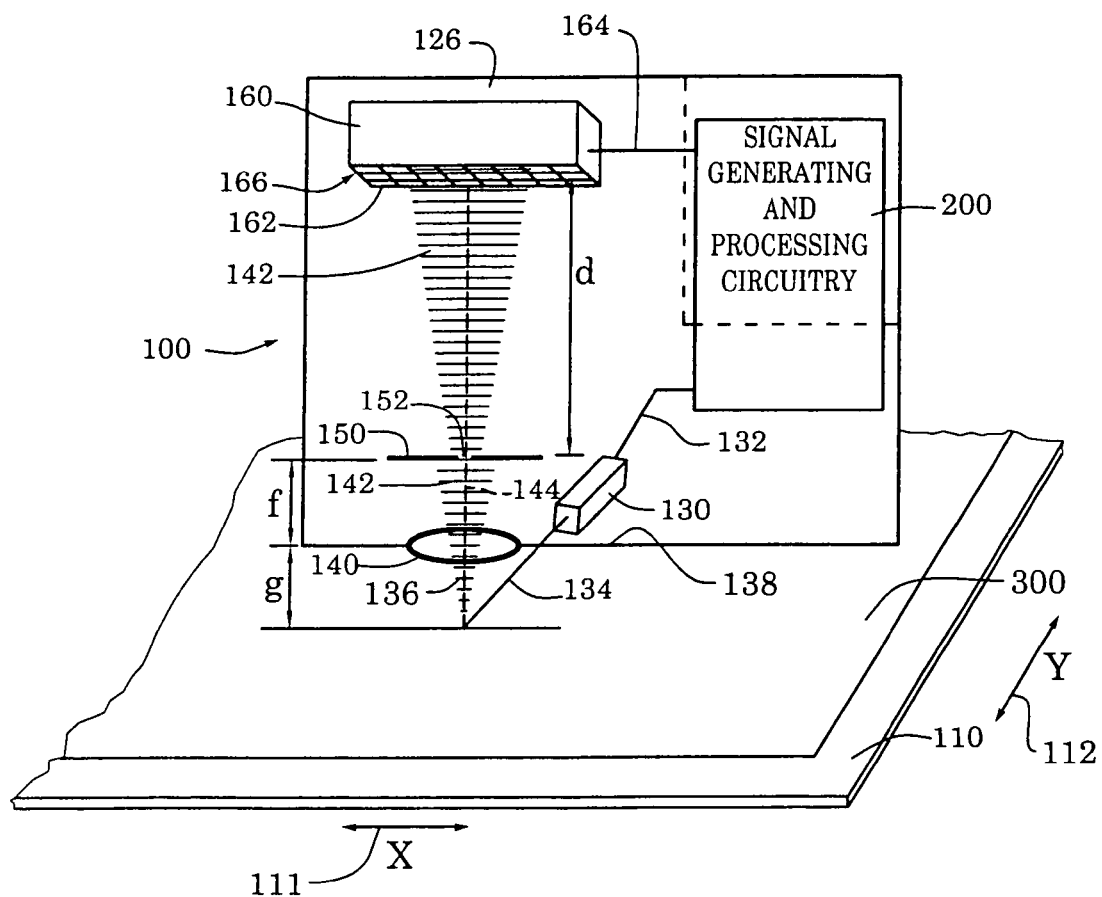
FIG. 1 is a block diagram of an exemplary optical position transducer configuration.

FIG. 1 is a block diagram of an exemplary optical position transducer 100 usable to generate a position measurement. The optical position transducer 100 includes a readhead 126, signal generating and processing circuitry 200 and a surface 110. The surface 110 may include a scale pattern 300, which may be imaged by the optical position transducer 100 to generate an incremental or absolute position measurement, or the surface may be an optically rough surface from which the optical position transducer 100 may generate a displacement measurement from a speckle pattern arising from the optically rough surface, without the need for a scale pattern. The components of the readhead 126, and their relation to the surface 110 and the scale pattern 300, are shown schematically in a layout that generally corresponds to an exemplary physical configuration, as further described below.

In particular, the surface 110 is positioned adjacent to an illuminating and receiving end 138 of the readhead 126, such that when the surface 110 is illuminated by light emitted from that end of the readhead 126 by a light source 130, the emitted light is selectively reflected back by the surface 110 towards imaging optical elements positioned at that end of the readhead 126. In operation, the surface 110 is positioned at a generally stable distance from the light source 130 and an optical system housed in the readhead 126. The surface 110 may move relative to the readhead 126 along one or two axes of relative motion, such as along a first measuring axis 111 and a second measuring axis direction 112, as shown in FIG. 1.

The relative motion in a third dimension orthogonal to the first and second measuring axes 111 and 112 is generally constrained, such as, for example, by conventional guide ways or bearings (not shown) mounted to a frame, to maintain the proper relative distance or gap between the readhead 126 and the surface 110. However, reasonably expected variations in the relative position of the readhead 126 and the surface 110 may also be accommodated as described further below. The readhead 126 may include an alignment feature (not shown) which aids in mounting the readhead 126, and aligns the internal components of the readhead 126 relative to the mounting frame and/or the expected axes of relative motion 111 and 112 of the surface 110.

In FIG. 1, the image receiving optical elements of the readhead 126 include a lens 140 positioned at the illuminating and receiving end of the readhead assembly 138 such that an optical axis 144 of the lens 140 is generally aligned perpendicular to the illuminated area of the surface 110. The readhead 126 may further include an aperture 152 included in a pinhole aperture plate 150, spaced apart from the lens 140 along the optical axis 144 by a distance coinciding with the focal length f of the lens 140, and a light detector 160 spaced apart from the aperture 152 included in the aperture plate 150 along the optical axis 144. Such a telecentric arrangement makes the magnification of the image of the surface 110 on the light detector 160 approximately independent of the object distance g from the lens 140 to the surface 110. If the design of the optical system is specified to tolerate variations in the relative position of the surface 110 and the lens 140, the aperture plate 150 may be omitted in various embodiments.

The light detector 160 can be any known or later-developed type of light sensitive material or device that can be organized into a 2D array of independent and individual light sensing elements, such as a camera, an electronic or digital camera, a CCD array, an array of CMOS light sensitive elements, or the like. Various exemplary spacings and tolerances of the positioning of the surface 110 and the readhead 126, including the lens 140, the aperture 152, and the light detector 160, are further outlined below.

The mounting of the light source 130, the lens 140, the aperture plate 150, and the light detector 160 in the housing of the readhead 126 may be done according to conventional methods of miniature optical system construction and/or industrial camera construction, provided that the components are mounted in a relatively precise and stable manner. When the readhead 126 is suitably positioned adjacent to the surface 110, each image captured by the light detector 160 will contain portions having characteristics that are determined by a corresponding portion of the surface 110.

The light detector 160 has an array 166 of image elements 162 spaced apart along two directions corresponding, respectively, to each of the two measuring axes 111 and 112, at a known spacing. This known spacing may be the same for the two directions corresponding to the two measuring axes 111 and 112, or may be different for each of the two directions. The known spacing along each of the two directions corresponding, respectively, to the measuring axis 111 and 112 provides the basis for a high resolution measurement of the displacement or offset along that measuring axis 111 or 112 between a later acquired "current" image projected onto the light detector 160 and a previously acquired "reference" image that includes an image portion that generally matches an image portion of the later acquired image. The known spacing in the direction along each measuring axis 111 and 112 generally provides the basis for measuring along each measuring axis 111 and 112 the displacement of the images of the surface 110 or the scale pattern 300 to resolution as fine or finer than the known spacing along that measuring axis 111 or 112 in the optical transducer 100.

While the image elements 162 of the light detector 160 are shown in FIG. 1 to be arranged in orthogonal rows and columns, with the rows aligned along a direction corresponding to one of the measuring axes in the obtained images, and the columns aligned along a direction corresponding to the other one of the measuring axes in the obtained images, other configurations are possible. In particular, the image elements 162 of the light 160 detector may not be arranged in orthogonal rows and columns that are aligned with the measuring axes in the obtained images, provided that a known spacing of the image elements 162 along each of the two directions, corresponding, respectively, to the measuring axes 111 and 112, can still be determined. In such a case, the known spacing along a direction corresponding to a respective measuring axis still provides the basis for high resolution measurement of the displacement or offset along that measuring axis between two similar current and reference images projected onto the light detector 160 or a current image projected onto the light detector 160 and a synthetic image reference image generically corresponding to an obtained current image.

In addition, the readhead 126 may include at least a portion of the signal generating and processing circuitry 200. As shown in FIG. 1, a signal line 132 from the signal generating and processing circuitry 200 is connected to the light source 130, to control and/or drive the light source 130. A signal line 164 connects the light detector 160 and the signal generating and processing circuitry 200. In particular, each of the image elements 162 of the array 166 can be individually and controllably addressed to output a value representing the light intensity on that image element 162 over the signal line 164 to the signal generating and processing circuitry 200. Additional portions of the signal generating and processing circuitry 200 may be placed remotely from the readhead 126, and the functions of the readhead 126 can be operated and displayed remotely. The signal generating and processing circuitry 200 is described in greater detail below with respect to FIG. 19.

As shown in FIG. 1, a light beam 134 is emitted by the light source 130 and is directed onto the surface 110 to illuminate a portion of the surface 110. As a result, the illuminated portion of the surface 110 reflects light 136 about the optical axis 144. The angle with which the light beam 134 strikes the surface 110, may be about 45° relative to the plane of the surface 110.

Light sensing elements 162 receive light from an illuminated portion of the surface 110. The optical displacement transducer may be a relative displacement transducer, and the displacement measurement may be performed using a speckle pattern. In this situation, some light sensing elements 162 in the detector 160 receive diffracted light waves which constructively interfere. These light sensing elements 162 would have a larger signal output than light sensitive detector elements 162 receiving diffracted light waves which destructively interfere, thus producing the speckle pattern on the surface of the light detector 160.

The optical displacement transducer may also be an absolute correlation position transducer using a conventionally imaged scale pattern 300, and the light source 130 may be an incoherent light source, such as a light emitting diode (LED) diode, and the surface 110 is nominally located in the focal plane of the lens 140, at a distance g from the lens 140. In such an absolute position transducer, a scale pattern 300 that can be conventionally imaged is employed on the surface 110, and the scale pattern 300 may include a pattern such as that shown in FIG. 18, which is usable to provide an absolute-type correlation position transducer. The light sensitive detector elements 162 receive image light from a portion of the surface 110 carrying the scale pattern 300, and form an image thereof on the surface of light detector 160.

Figure 3:
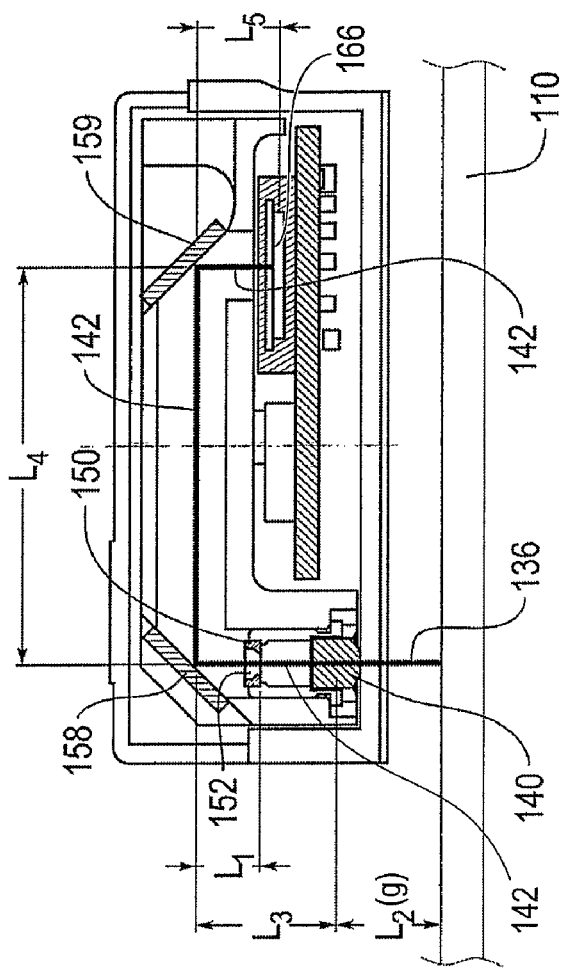
FIGS. 2 and 3 are exemplary end and side views, respectively, of the optical position transducer of FIG. 1.
Figure 2:
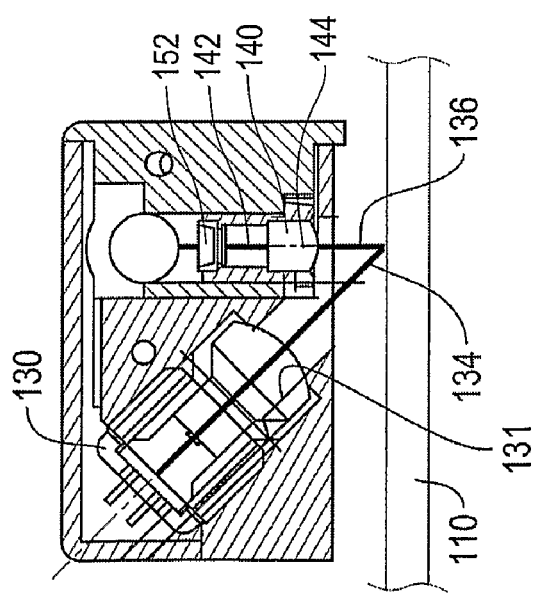

FIGS. 2 and 3 show exemplary end and side views, respectively, of a configuration of the optical position transducer shown in FIG. 1. In a conventional imaging type optical position transducer, the light source 130 may be a light emitting diode that emits incoherent light. In a speckle imaging type optical position transducer, the light source 130 may include a laser diode that emits coherent light. In either case, in the optical position transducer shown in FIGS. 2 and 3, the emitted light is collimated by collimating lens 131 and the resulting illumination beam 134 may be directed at approximately a 45°+/−10° angle of incidence to the surface 110, although smaller angles of incidence are preferred, if possible and practical. The light is then reflected by surface 110. A portion of the reflected light forms the reflected beam 136 that a passes through the lens 140 and is projected as light 142 to an aperture 152 in a pinhole aperture plate to reach to a first mirror 158. The beam of light 142 is reflected by the first mirror 158 to a second mirror 159. The beam of light 142 is further reflected by the second mirror 159 onto the detector 160. It should be appreciated that only the central axes of the beam 134, the reflected beam 136 and the beam of light 142 are shown in FIGS. 2 and 3. In general the beam 134 and 136 will have a beam diameter larger than the aperture 152, so that the aperture 152 is the limiting aperture of the optical system.

The beam 134 and the beam 136 are shown to be at about a 45° angle relative to each other in a plane perpendicular to the surface 110. The first and second mirrors 158 and 159 each change the direction of the beam 136 by about 90°. The distance L2 between the surface 110 and the effective plane of the lens 140 may be about 4.5-5.5 mm. The distance (L3-L1) between the lens 140 and the aperture 152 may be about 4.5 mm. The distance L1 between the first mirror 158 and the aperture 152 may be about 4.1 mm. The distance L4 between the first and the second mirrors 158 and 159 may be about 23.7 mm. The distance L5 between the second mirror 159 and the detector array 166 may be about 5.3 mm.

Figures 4A, 4B:
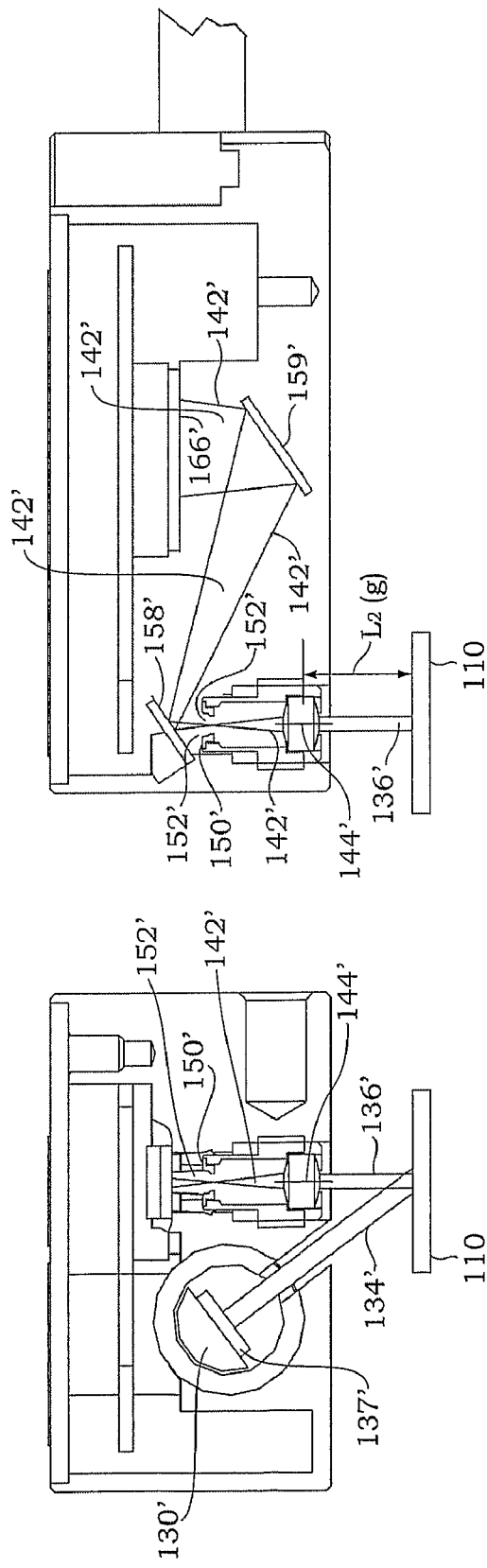
FIGS. 4a and 4b are other exemplary end and side views of the optical position transducer of FIG. 1.

FIGS. 4a and 4b are other exemplary end and side views of a configuration of the optical position transducer of FIG. 1. Here, similarly numbered elements are analogous, or identical, and function similarly, and the primary difference between this second exemplary views and the first exemplary views shown in FIGS. 2 and 3 is that the angles and/or positions of the mirrors 158' and 159' are altered compared to those of the mirrors 158 and 159 of the first exemplary view, to transmit the beam of light 142' along a different path. The arrangement shown in FIGS. 4a and 4b may be preferable when it is advantageous in terms of assembly or size to have the electrical leads to detector 160' on the same side of the optical displacement transducer as the electrical leads to the source 130', for example. In order to better explain the present invention, FIGS. 4a and 4b also illustrate the nominal operative boundaries of various portions of the light beam 142', rather than just the central axis as shown in FIGS. 2 and 3. It should be appreciated that the operative light beam boundaries are determined by the light rays that coincide with the extents of the operative pixel address window. The beam 134' is emitted as parallel, non-divergent light from the source 130' by using a collimating lens (not shown). As in FIGS. 2 and 3, the beam 134' strikes the surface 110' at an angle of approximately 45°+/−10° (or less, if possible and practical), and a portion of light of the beam 134' is reflected by the surface 110 and enters the lens 140'. The lens 140' focuses the transmitted beam of light 142' at the aperture 152' of a pinhole aperture plate 150', and then beam of light 142' continues onto the turning mirrors 158' and 159', and finally to form an image on the detector 160', as shown in FIGS. 4a and 4b. Turning mirror 158' is disposed at a different angle than the corresponding turning mirror 158 in FIG. 1, to redirect the beam onto turning mirror 159' which is located beneath the detector 160', rather than above it, as was the case in FIG. 1.

Figure 5:
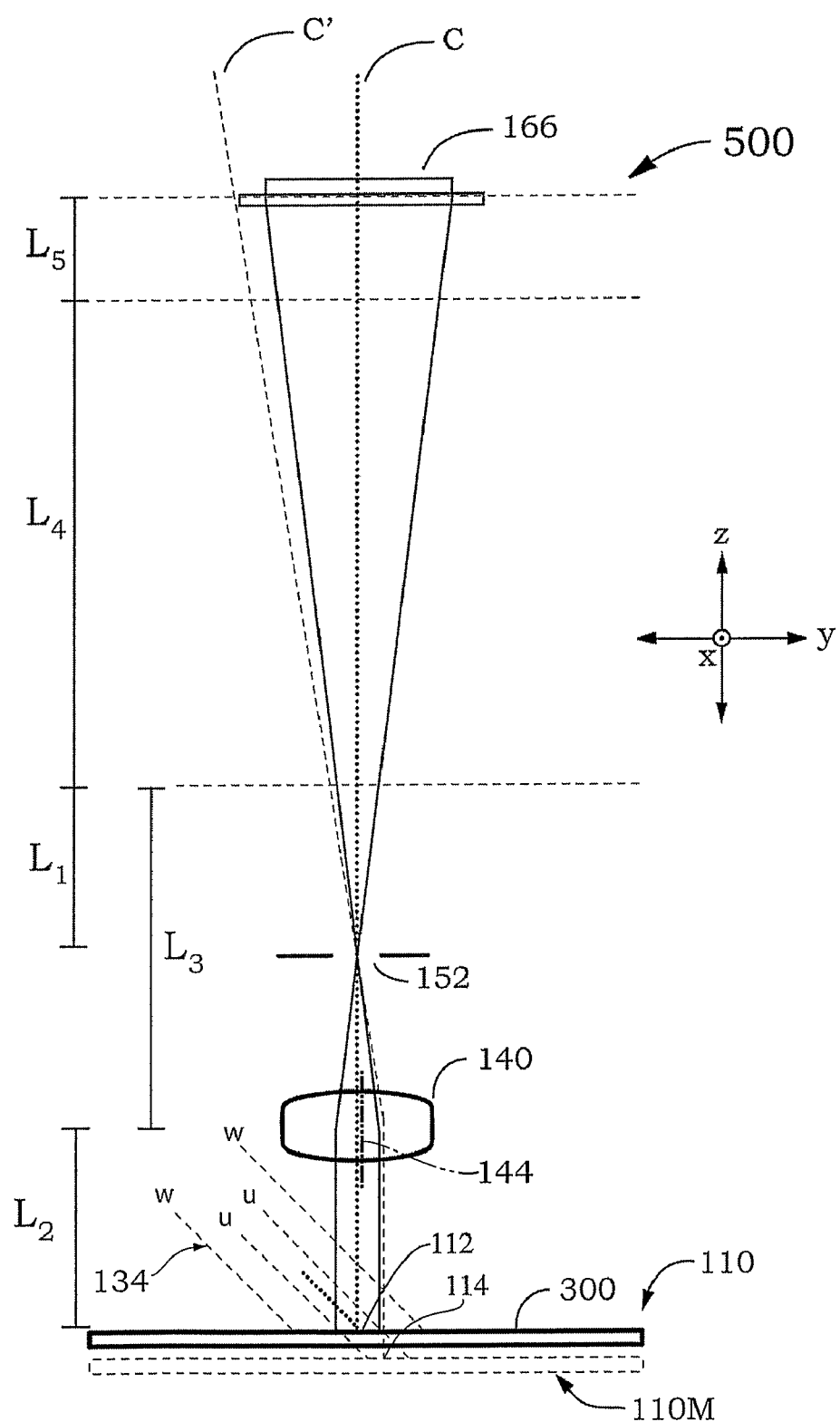
FIG. 5 shows diagrammatically how a shift in the distance between the target surface and the readhead shown in FIGS. 2, 3 or 4, can shift the location of an imaged portion of the target surface on the detector area.

In situations in which the operative gap $L_2$ (or g) between the optical position sensor and the surface 110 is not well established and/or controlled, variations in the gap dimension g will cause the illumination spot on the surface 110 to move relative to the optical axis 144', because of the non-normal angle of incidence of the beam 134' relative to the surface 110. FIG. 5 illustrates this effect using a schematically-illustrated "unfolded" optical path arrangement 500 which is otherwise similar to the optical path shown in FIGS. 2 and 3.

As shown in FIG. 5, when the surface is located at the nominal operating gap associated with the surface having the reference numeral 110, the central ray of the illumination beam 134 strikes the surface 110 at a point 112, which approximately or completely coincides with the optical axis 144 of the nominally aligned optical system. From the point 112, that central light ray travels through the lens 140 and through the aperture 152, and strikes approximately at the center of the detector 166 as indicated by the nominal path of the illumination central ray labeled "C".

However, when the surface is located at the "misaligned" operating gap associated with the surface having the reference numeral 110M, the light travels along the non-normal angle of incidence an additional distance, which is proportional to the difference between the respective gaps associated with the reference numerals 110 and 110M. Therefore, the central illumination ray strikes the surface at another point 114, which is displaced laterally off of the nominal optical axis 144 of the optical displacement transducer. The light "misaligned" central illumination ray from point 114 then also travels through the lens 140 and aperture 152, but, because it is off of the nominal optical axis 144, it strikes the approximately at the edge of the detector array 166 as indicated by the misaligned path of the misaligned illumination central ray labeled C'. Accordingly, it should be appreciated that in various optical displacement sensors that illuminate the target surface 110 along a non-normal angle of incidence, changes in the gap between the target surface 110 and the optical displacement sensor cause the overall "long-range" intensity pattern in the correlation images, that is, the overall intensity pattern corresponding to illumination intensity distribution in the light beam 134, to translate laterally across the detector array 166.

The illumination intensity pattern of the illumination light beam 134 may comprise a Gaussian distribution, such as that typically provided by a laser diode. In FIG. 5, the portion of the illumination light beam 134 between the dashed lines labeled "u" represents the relatively uniform and high intensity central portion of such a Gaussian distribution, for example, the portion of the distribution which has an illumination intensity not less than 80% of the peak intensity of the distribution. The dashed lines labeled "w" represents the entire width of the Gaussian distribution, that is, the portion of the Gaussian distribution that includes substantially all of the optical power. It should be appreciated when the gap is the nominal gap, the relatively uniform and high intensity central portion of such a Gaussian distribution that surrounds the central ray of the Gaussian distribution will fall approximately in the middle of the detector array 166, as indicated by nominally aligned central ray path labeled "C". In contrast, when the gap is not the nominal gap, the relatively uniform and high intensity central portion of such a Gaussian distribution that surrounds the central ray of the Gaussian distribution will fall away from the middle of the detector array 166, for example, in an extreme case, off or near the edge of the detector array 166, as indicated by the misaligned central ray path labeled C'.

It should be appreciated that, as previously mentioned, a relatively more uniform correlation image intensity tends to increase the accuracy of the correlation operations used for displacement measurements, as does the relatively higher image contrast available in the parts of the correlation image that have a relatively higher average intensity. Therefore, the location of the operative pixel address window, that is, the location of the subset of light sensitive pixels or elements that are actually output or acquired from the detector array to potentially participate in the correlation calculation, may be determined and selected to coincide is nearly as possible with the location of portion of the image received by the entire area of the detector array 166 that has approximately the highest average intensity and/or the most uniform intensity, as outlined in greater detail below. Furthermore, the detector array 166 may be chosen, such that its area is large enough to accommodate or encompass misalignments of the desired central portion of the expected overall image intensity pattern on the detector, due to both reasonably expected assembly and component variations inside the optical displacement sensor and reasonably expected changes in the gap dimension g, which occur when the device is actually mounted in the field.

Therefore, the chosen detector area may be equal to or greater than a minimum area that depends not only on the requirements of the displacement measurement, such as range and resolution, as described in further detail below, but also on a tolerance stackup of the optical path components and reasonably expected gap variations during installation and operation and the field. For example, assuming that the allowed variation in the gap g between the lens 140 and the measurement surface 110 during mounting installation is about +/−100 μm. Because of the approximately 45° non-normal angle of incidence of the illumination beam 134 on the target surface 110, the location of the illumination spot reflected by the surface 110 may move sideways by about +/−100 μm. Assuming the optical displacement sensor provides a 5× magnification of the image arising from the target surface one the detector array 166, the illumination central ray path C' will move about +/−500 μm across the surface of the detector array 166. Thus, to accommodate or encompass this variation, with about a 6 μm pixel pitch between the light sensitive detector elements 162, the center of the overall intensity pattern may move by up to approximately 500/6=83 pixels along the direction of the detector array 166 that corresponds to the direction of the apparent displacement of the central illumination ray of the illumination beam 134 on the surface 110 (due to the variation in the gap g in combination with the angle of incidence of the illumination beam 134.) Therefore, if optical displacement sensor is designed such that the expected pixel address window nominally encompasses the desired high, intensity and relatively uniform central portion of the overall image intensity pattern on the detector array 166 and is, for example, 256×256 pixels in area, the minimum detector size along the direction that corresponds to the direction of the apparent displacement of the central illumination ray is 256+2*83=422 pixels, and along that direction of the detector array 166, the number of pixels of the detector array 166 may be at least 60% larger than the number of pixels in the expected pixel address window along that direction. The allowable mounting variation may also be more restricted and/or a less conservative design guideline is used, and the number of pixels of the detector array 166 along that direction is only at least 50% larger, or only at least 40% larger, than the number of pixels in the expected pixel address window along that direction. In some cases, the availability and economy of detector arrays having approximately 640× 480 pixels is a dominant design factor. Thus, using another way of describing the relationship between the array size and the pixel address window size, when a pixel address window of 256×256 pixels is used with such detector arrays, the area of the detector array is greater than four times the area of the pixel address window Because the area of the detector may be larger than the area of the pixel address window on the detector, not all of the pixels of the detector array 166 may provide useful image information in terms of the correlation calculation to follow, and therefore their image data may not be output or "acquired". Because not all of the pixels in the detector may be output or used to perform the correlation measurement, the rate of correlation measurements is significantly improved. Nevertheless, a desired measurement resolution may be retained by using a pixel correlation area (within the pixel address window) that has a sufficient number of pixels chosen to provide the desired measurement resolution, as will be explained further below.

As previously outlined, the location of the pixel address window on the detector is determined and selected according to this invention from a complete set of, or at least a relatively large portion of, the pixels of the detector array 166, by applying certain criteria to output image values that are acquired during a set of pixel address window determining and selecting operations. The location of the pixel address window on the detector may be selected automatically by a factory and/or field calibration routine, or chosen by a technician based on review of an acquired image. The calibration image acquisition and calibration may be performed by an initial setup algorithm after establishing the actual operating gap by mounting the device in the field, and/or at the end of the manufacturing assembly process by establishing a nominal operating gap and performing the initial setup algorithm. As previously mentioned, this calibration chooses the location of the subset of image pixels within the detector area which will have their image value data output to potentially participate in the correlation calculation of the optical displacement transducer.

Figure 6:
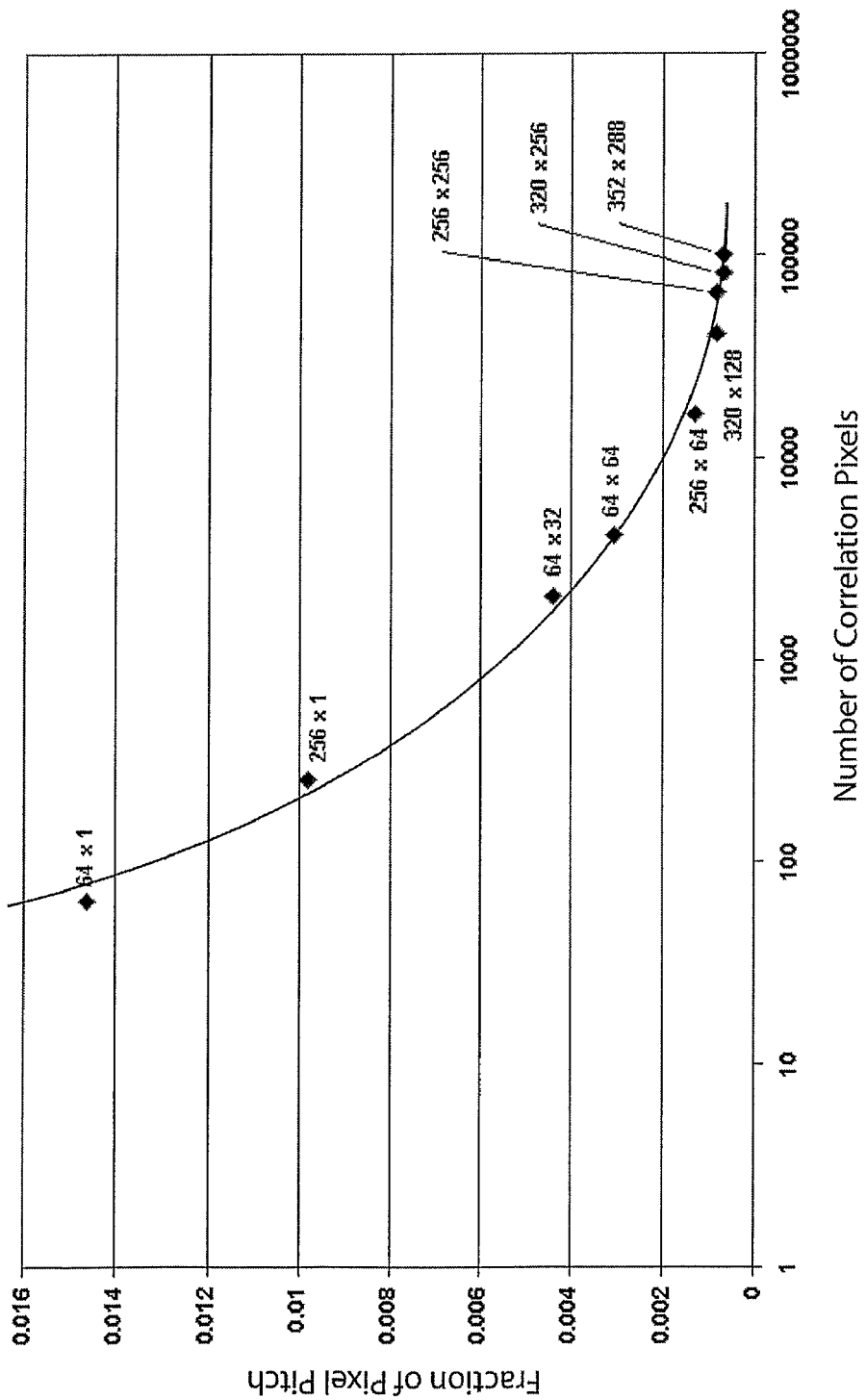
FIG. 6 shows a curve that reflects a typical relationship between the number of correlation pixels that participate in a correlation calculation and the subpixel interpolation level generally achievable with that number of correlation pixels.

A first consideration in choosing the size of subset of pixels which will potentially participate in the correlation routine, that is, the size of the pixel correlation area and/or the pixel address window, may be the measurement resolution required of the device. FIG. 6 shows a curve that reflects a typical relationship between the number of correlation pixels that participate in a correlation calculation and the subpixel interpolation level generally achievable with that number of correlation pixels. As can be seen from the figure, increasing the number of pixels included in the correlation calculation rapidly improves the achievable subpixel interpolation level, and the resulting the measurement resolution, over a range of about 64 pixels to 4096 pixels. However, thereafter, including additional pixels in the correlation calculation provides diminishing returns, in that the improvement in resolution is more gradual with the addition of a large number of pixels. For example, as can be seen from FIG. 6, using more than 16,384 (256×64 pixels) pixels in the correlation routine offers relatively insignificant improvement in the subpixel measurement resolution, regardless of the number of additional pixels used.

As shown in FIG. 6, using approximately 16,384 pixels, or a pixel correlation area of 128×128 pixels, consistently yields a correlation measurement standard deviation of about 0.002 pixel pitches. Thus, for a pixel pitch corresponding to about 1 μm of displacement at the target surface, a correlation area of 128×128 pixels generates a measurement with a standard deviation of about 2 nm. Furthermore, it is reasonably conservative to assume that an interval of five standard deviations will include substantially all of the actual correlation measurement values obtained by repeated measurement at a given position. Thus, a pixel correlation area of 128×128 pixels may be used, and an accurate and reliable measurement resolution of about 5*0.002 pixel pitches, or 0.01 pixel pitches, is achieved. A pixel pitch corresponding to about 1 μm of displacement at the target surface, may reliably provide a measurement resolution of about 10 nm. Alternatively, the correlation area may contain between about 10000 and about 22500 pixels. More generally, the pixel correlation area is sized to provide the number of pixels required to provide the desired measurement resolution for any particular design or application, and a pixel correlation area having 256, or even 64 pixels, may be used.

Figure 16:
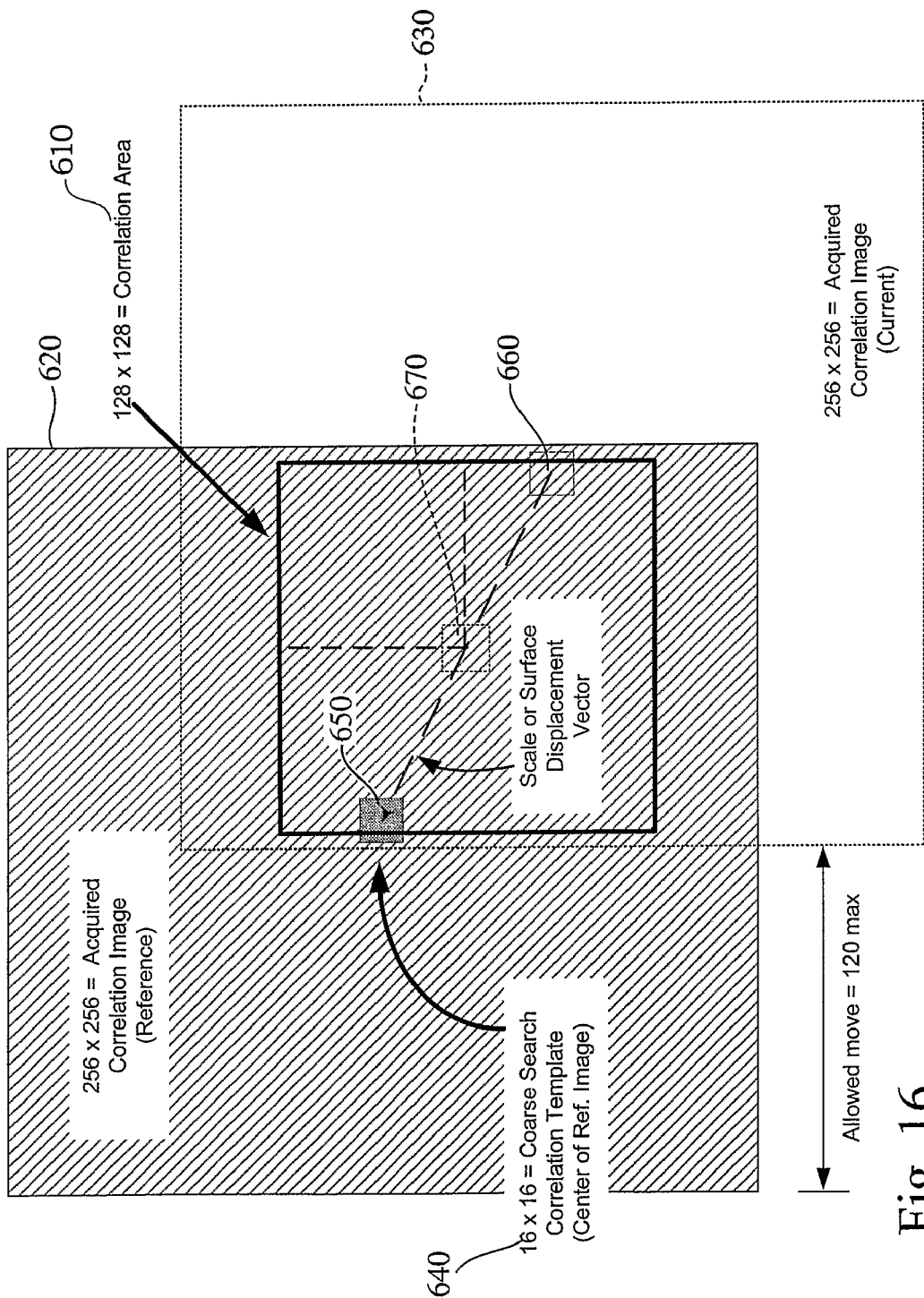
FIG. 16 illustrates one method of rapidly estimating an approximate correlation peak location, based on the location of a 16×16 coarse search template.

As best seen in FIG. 16, the pixel correlation area should be contained in the overlap area between the reference image and the current image, and within the pixel address window, as described further below. To provide approximately the largest possible range of movement of the target surface that is practical without updating the reference image, while still achieving a high resolution measurement at a high rate, the dimensions of the pixel address window within the output or acquired reference image and the current image may be chosen to be approximately twice as large as the pixel correlation area. Thus, a pixel address window of 256×256 pixels, which will include the 128×128 pixel correlation area used in the image correlation operations, may be selected from the larger number of pixels of the detector array.

Figure 7A:
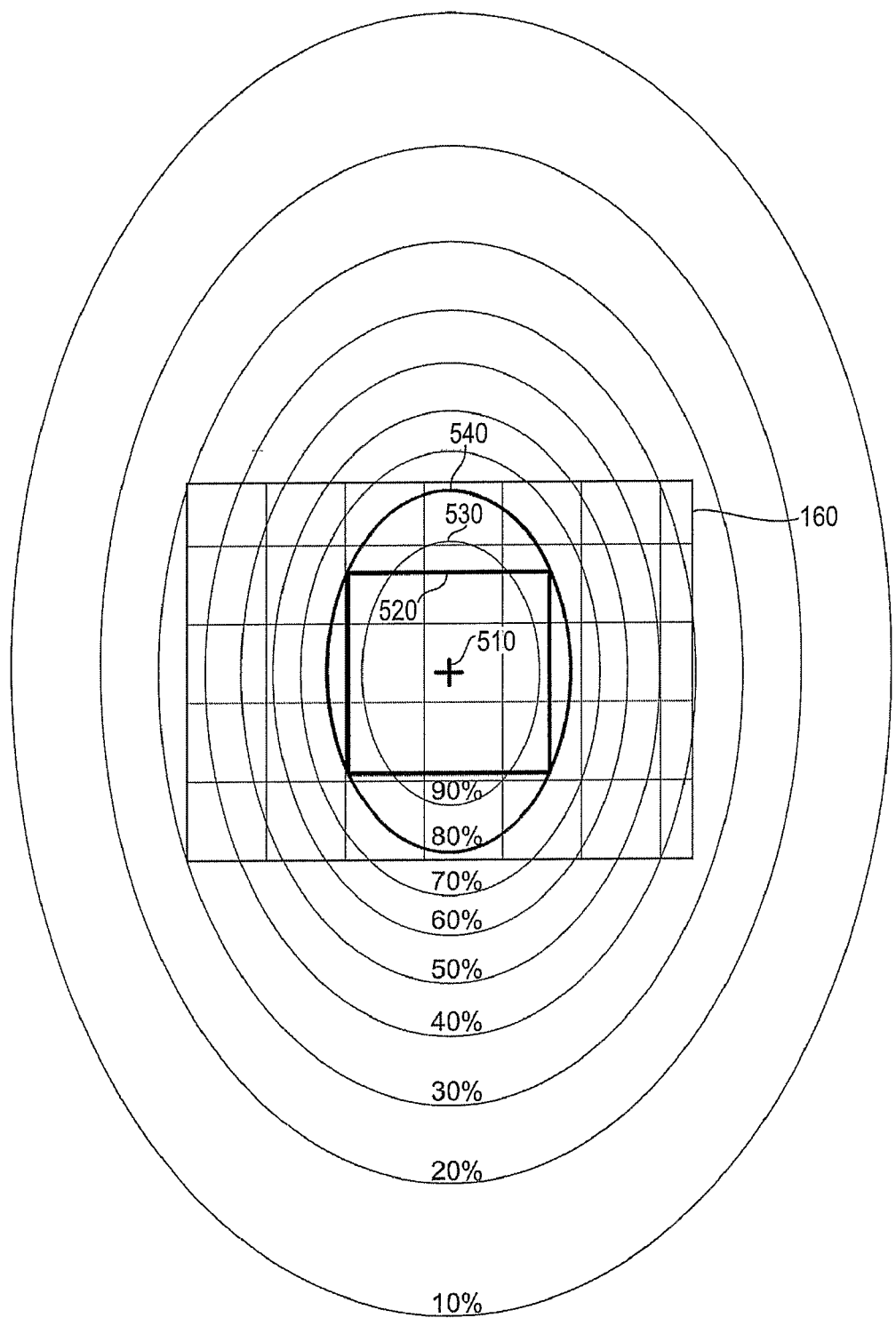
FIG. 7a shows the nominal pixel intensity distribution on the detector area for a first, nominal, case of assembly and mounting dimensions.

With reference to FIGS. 2, 3, 4*a* and 4*b*, one or more of the mirrors 158, 159, 158' and 159' may be adjusted during assembly to locate the relatively more intense and or uniform central portion of the overall image intensity pattern corresponding to the central portion of the illumination beam 134 in the center of the detector array 166, at the nominal gap dimension. Alternatively, an illumination beam turning mirror, such as the turning mirror 137', best seen in FIG. 15*a*, maybe adjusted to accomplish the same function. This situation is shown in FIG. 7*a*, where the center 510 of the overall image intensity pattern is shown as located in the center of pixel array 166, which may have approximately 640×480 pixels, and may alternatively have more or fewer pixels. Ideally, the center 510 of the overall image intensity pattern, also called the beam spot center 510 herein, may be determined by determining which light sensitive element 162, or limited set of light-sensitive elements 162 in the detector array 166, has the maximum image intensity or average image intensity. With the center of detector array 166 coinciding with the beam spot center 510, the pixel address window 520, from which pixels will be selected which will be used in the correlation computations, may be the 256×256 array of pixels with the beam spot center 510 at its center. In general, the pixel address window may be centered on the region or portion of the detector array 166 that coincides with the maximum image intensity, which is generally approximately centered on the beam spot center 510. The illumination and/or the pixel address window may be designed such that the pixel address window includes only pixels within a region of the overall image intensity distribution that coincides with a certain minimum percentage of the nominal maximum intensity of the overall image intensity distribution, for example, within 80%, of the maximum of the image intensity distribution as shown in FIG. 7*a*. This tends to insure that the pixel address window coincides with a relatively uniform and high intensity central portion of a desirable image intensity distribution, which tends to provide the best measurement resolution and accuracy, as previously described.

The elliptical beam shape shown in FIG. 7*a* results from the approximately 45 degree angle of incidence with which the illumination beam 134 strikes the target surface 110. The intensity distribution illustrated in FIG. 7*a* corresponds to a Gaussian illumination beam, wherein the beam intensity falls off according to a Gaussian distribution as a function of the radial distance from the beam center, which corresponds to the beam spot center 510. The intensity contour line 530 is set of points at which the illumination and/or image intensity has fallen to 90% of the maximum intensity at the beam spot center 510. The intensity contour line 540 corresponds to the set of points at which the illumination and/or image intensity has fallen to 80% of the beam intensity at the beam spot center 510, and so on. As previously mentioned, the pixel address window and/or the illumination distribution may be designed such that pixel address window includes only points within approximately the 80% contour line of the overall image intensity distribution on the detector 160. This provides a level of intensity and uniformity of intensity which tends to provide the best practical measurement resolution.

Figure 7B:
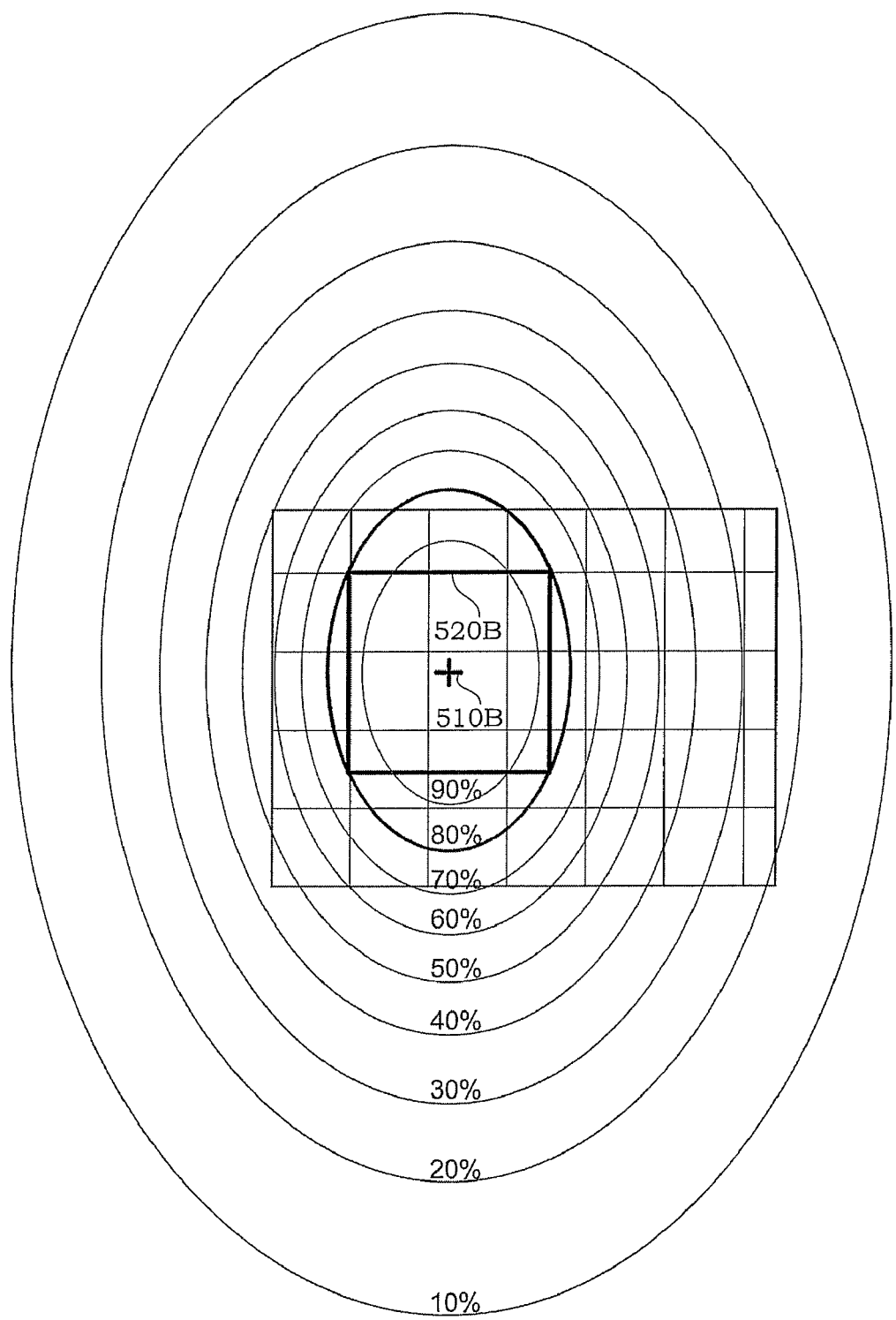
FIG. 7b shows the pixel intensity distribution on the detector area for a second case of slightly shifted assembly and/or mounting dimensions.

FIG. 7*b* illustrates a situation in which the beam spot center 510B falls away from the center of the detector array 166. This situation can occur as a result of less-than-ideal optical components or assembly, or a non-nominal gap dimension g, as was illustrated in FIG. 5. In this case, the beam spot center 510B is shifted left and up compared to the center of the detector array. The pixel address window is defined as in the previous figure, that is, as a 256×256 set of pixels that is, ideally, centered on the beam spot center 510B and that generally contains those pixels with a nominal image intensity distribution value level within 80% of the nominal maximum image intensity distribution value. Thus, the pixel address window 520B in FIG. 7*b* is shifted to the left and upward with respect to the center of the detector array, in order to coincide with the beam spot center 510B.

Figure 7C:
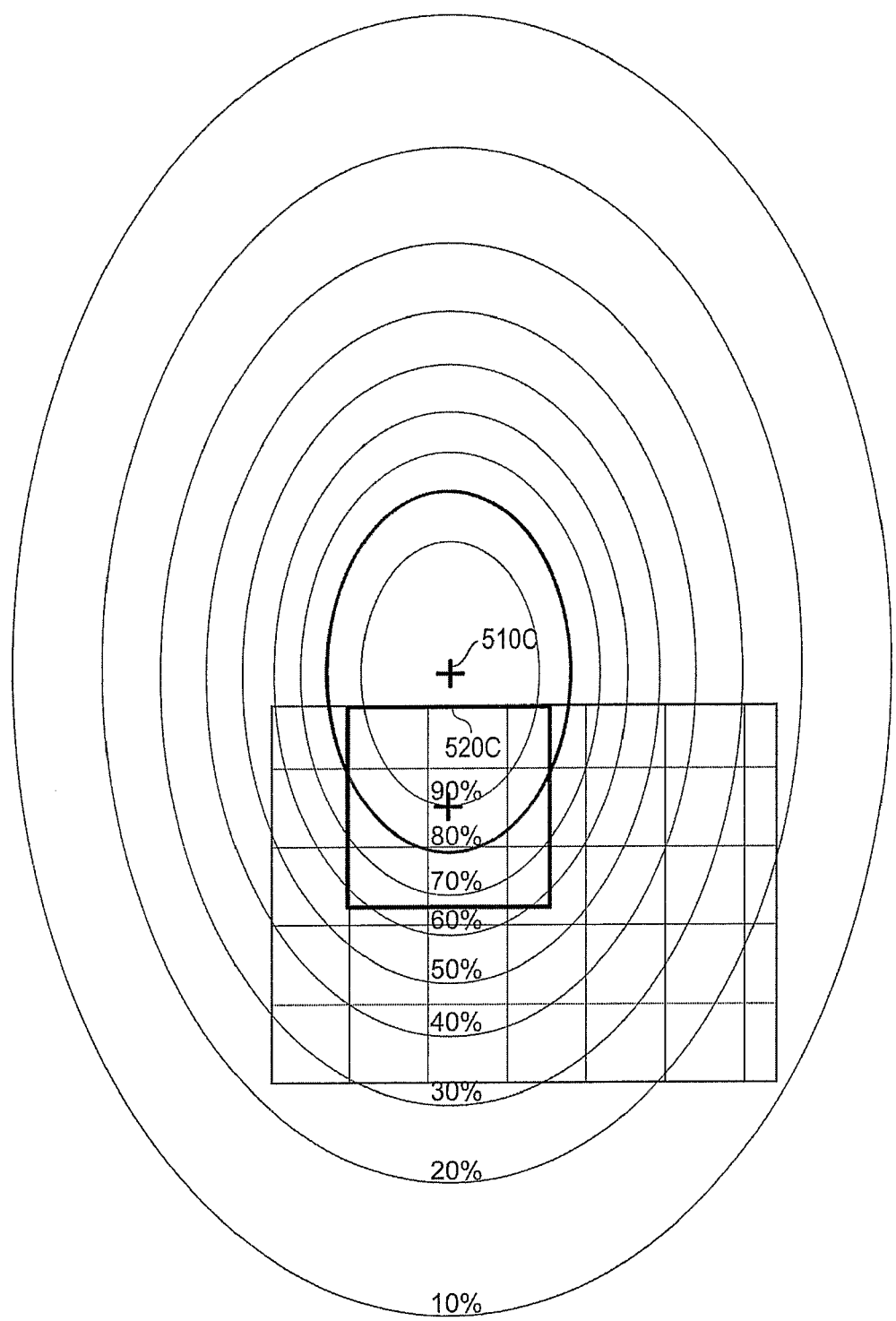
FIG. 7c shows the pixel intensity distribution on the detector area for a third case of significantly shifted assembly and/or mounting dimensions, with the center of the illumination beam spot shifted outside the field of view of the detector.

FIG. 7*c* illustrates a situation corresponding to that shown in FIG. 5, wherein the beam center 510C is shifted completely off the detector array 166 due to poor assembly or gap setting during installation. This situation may be effectively coped with by choosing the pixel address window to coincide with those image pixels within the detector array 166 which have the best level of intensity and uniformity, even if this is not the ideal or desired level of intensity and uniformity. An algorithm for choosing the pixel address window for this situation, as well as the previously illustrated situations, will be discussed in detail below. The pixel address window 520C is shown for this situation as being located at the top edge of the detector array 166, and shifted left of center, so that it is approximately as close as possible to the beam spot center 510C and the desirable central portion of the image illumination distribution. The configuration of the optical displacement sensor may be such that that a shift in the gap dimension g may only result in a shifting of the beam spot along the vertical direction in the previous illustrations of the detector array 166. The shift to the left (or right) may be a result of other misalignments such as misadjustment of mirrors 158 and 159 of FIGS. 3 and 4*b*, or mirrors 158' and 159' of FIGS. 4*a* and 4*b*, or the like.

Figure 7D:
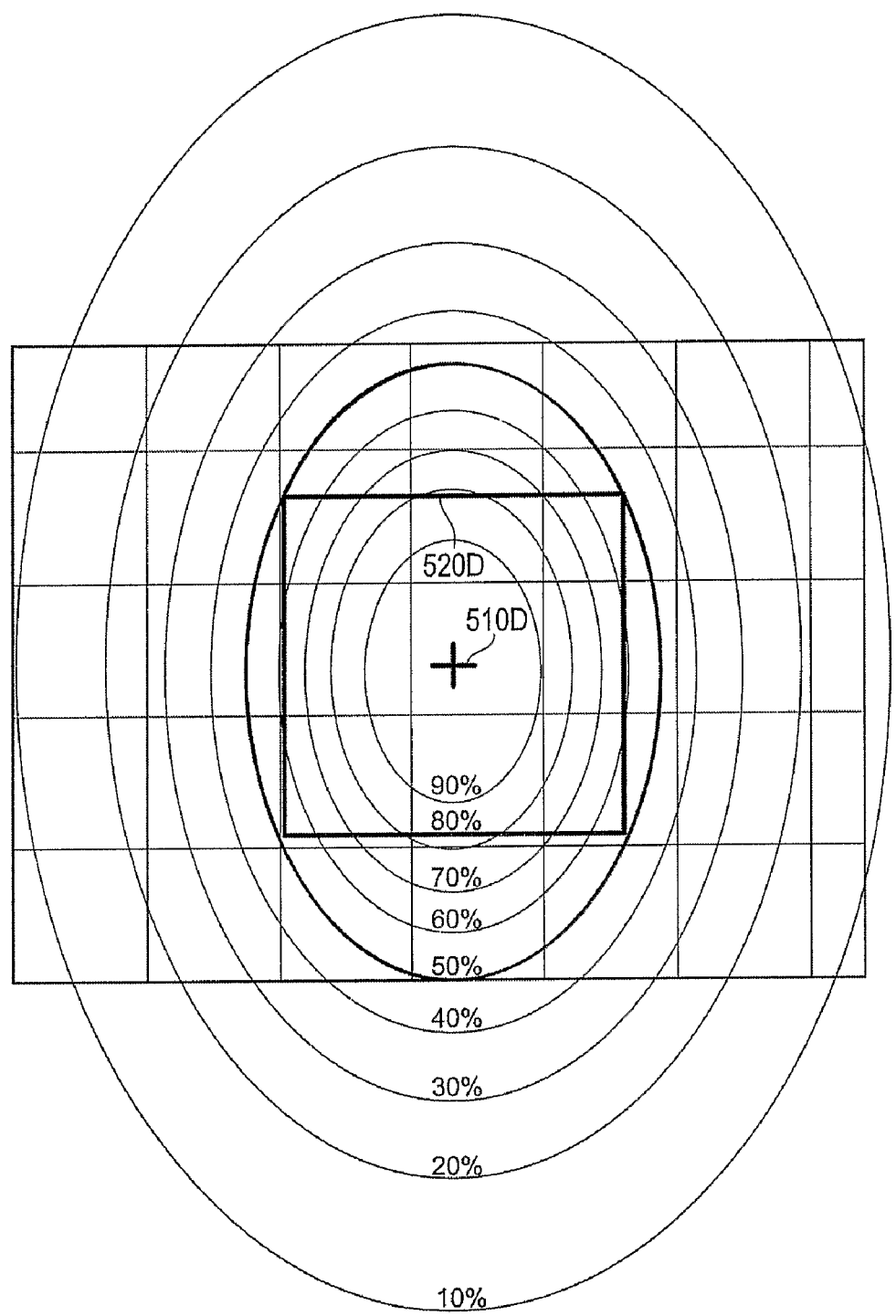
FIG. 7d shows the nominal pixel intensity distribution on the detector area for a fourth, nominal, case of assembly and mounting dimensions and an image resulting from a more concentrated illumination beam.

FIG. 7*d* illustrates a situation in which the design of the illumination system is such that the beam intensity distribution in the illumination beam 134 is more concentrated toward the center of the beam, and therefore drops off more rapidly in the outer portions of the beam compared to the situation shown in FIGS. 7*a*-7*c*. As a result, in FIG. 7*d*, the pixel address window 520D, which may be identical to the previously illustrated pixel address windows, includes pixels with an nominal image intensity as low as about 50%-60% of the maximum nominal image intensity in the overall image intensity distribution. The resulting level of overall image intensity uniformity in the pixel address window 520D is less than in the previously illustrated pixel address windows. Nevertheless, this illumination and/or image intensity distribution, and even more concentrated distribution, may be usable, and only a slight reduction of the resulting measurement resolution and accuracy may be incurred.

Figure 8:
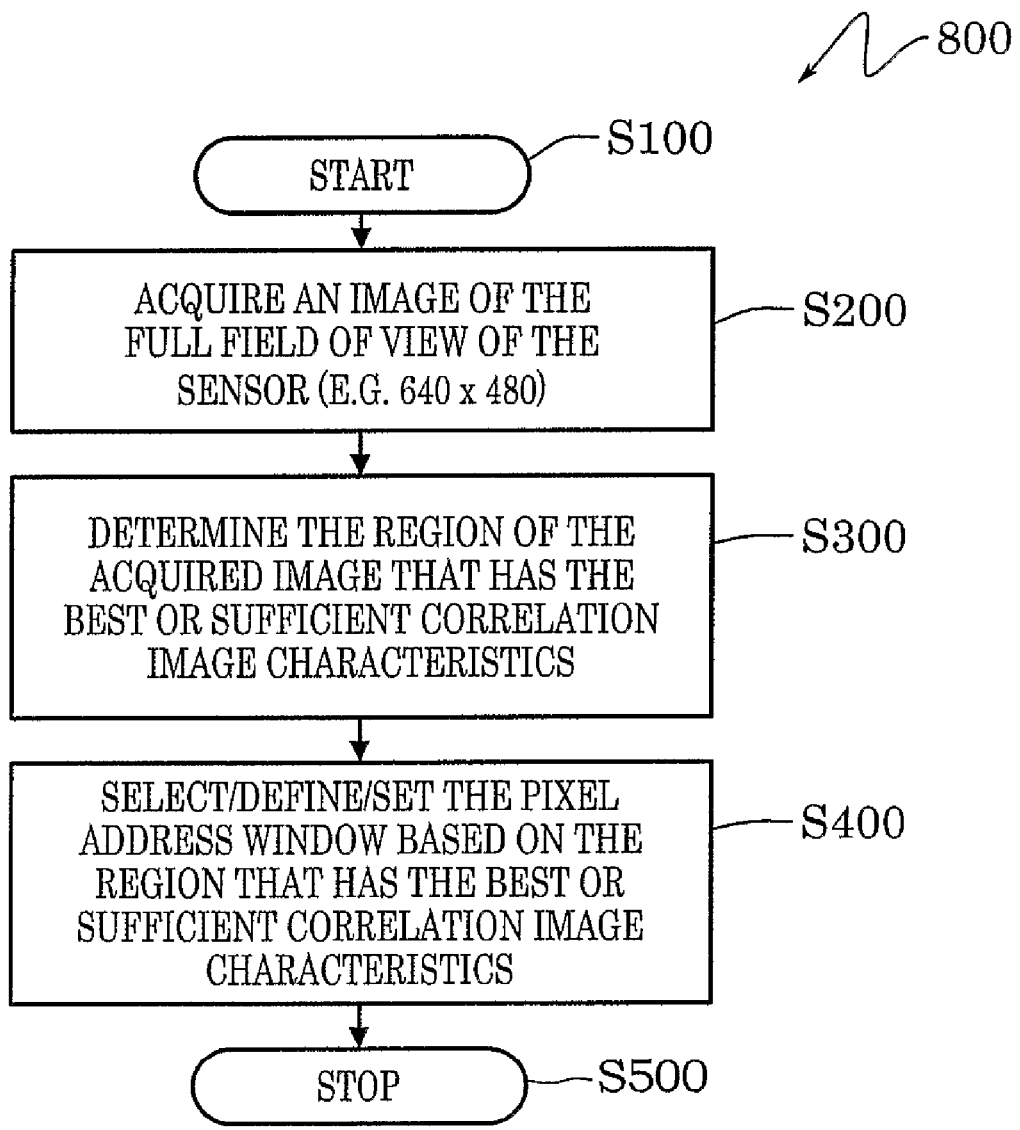
FIG. 8 is a flow chart illustrating a method for selecting a subset of pixels in the detector array for the pixel address window.

One exemplary generic algorithm for selecting the location of the pixel address window within the detector array is shown in FIG. 8. The operations shown in FIG. 8 may be executed once, automatically or manually, as part of a calibration or set up procedure, or as often as desired during operation for obtaining proper or enhanced measurement accuracy and/or resolution from the optical displacement sensor. When the operations are preformed during operation of the device, the timing and number of the operations may be limited depending on the required rate for outputting the measurement results. Assuming an operably arranged displacement sensor and target surface, and a detector array that hypothetically includes an array of 640×480 pixels for the purposes of this explanation, the method begins in step S100 and proceeds to step S200, wherein an image, that is, the image values, of the full field of view of the detector array is output or acquired. In step S300, the image is analyzed and the region in the image with the best or sufficient correlation image characteristics is determined. In step S400, the pixel address window is selected to at least approximately coincide with those pixels in the region determined to have the best or sufficient correlation characteristics. The process ends in step S500.

The signal generating and processing circuitry 200 may include circuits, routines or applications that are usable to store and/or output an image acquired by the detector 160 for display on a display device such as a video monitor, or the like. The operations illustrated in FIG. 8 may be performed, for example, by an operator or technician who is easily trained to observe the displayed image and its associated intensity distribution, and intuitively or qualitatively choose the region in the image having the best or sufficient correlation characteristics. Alternatively, the optical position transducer may perform the routine automatically as a setup or calibration routine performed only once, or infrequently, either upon deployment in the field and/or as a last calibration in the factory. The automatic setup routine may be a software program which performs the setup routine illustrated in FIG. 8. Execution of the automatic set up routine may be initiated manually, or automatically by default at power up.

Figure 9:
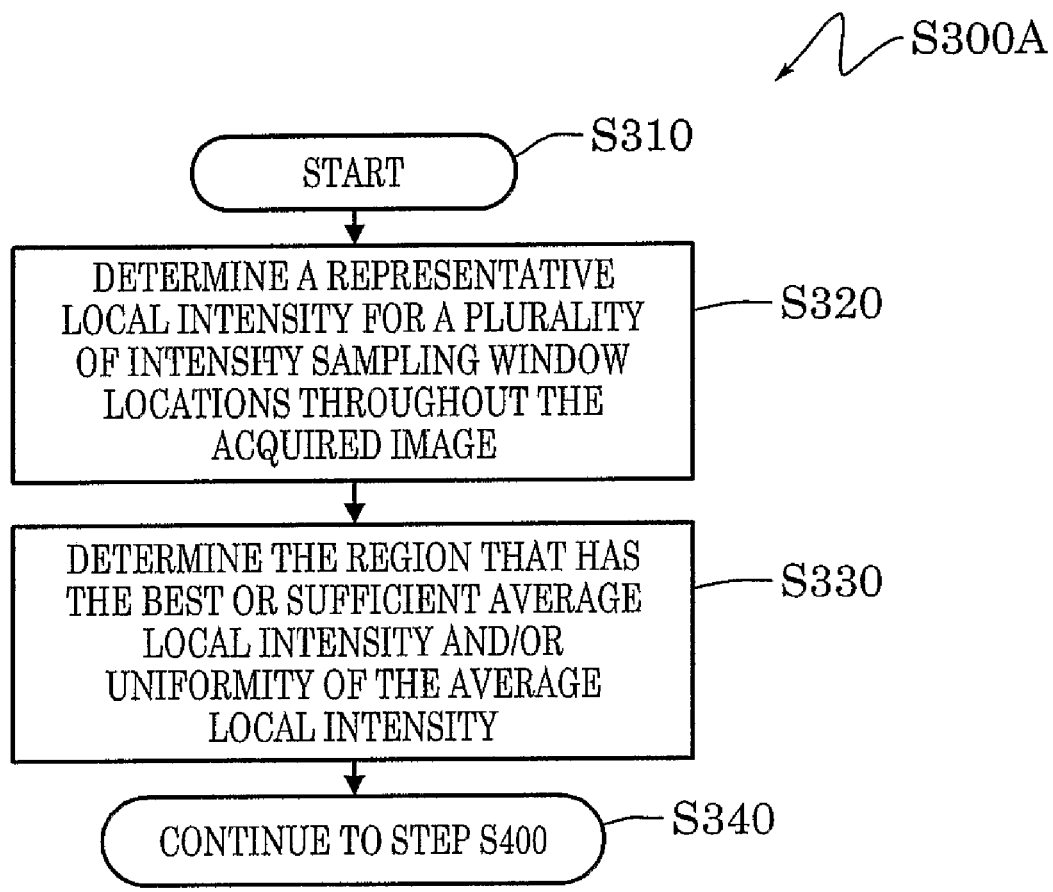
FIG. 9 is a flow chart showing in further detail one exemplary method for implementing step S300 of the flow chart of FIG. 8.

FIG. 9 shows one exemplary set of operations S300A usable for the step S300 of FIG. 8. The operations shown in FIG. 9 begin at step S310, and proceed to step S320. In step S320, a representative local intensity, such as an average intensity, is obtained for each one of a set of windows located at different locations within the detector array. The set of windows may approximately, or completely, cover the entire detector array. The process then proceeds to step S330, wherein the region that includes the window or windows having the best or sufficient representative, or average, intensity and/or uniformity of intensity is determined. The process then returns to step S400, wherein the pixel address window is determined, based on the region having the best or sufficient average intensity and/or uniformity of intensity.

Figure 10A:
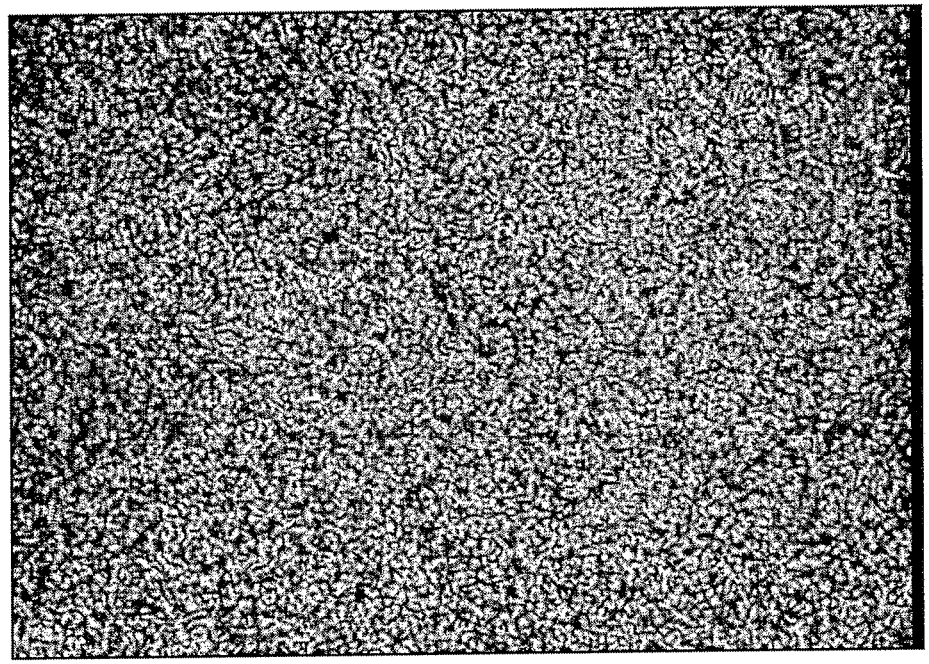
FIG. 10a shows a speckle image acquired by an optical position transducer.
Figure 10B:
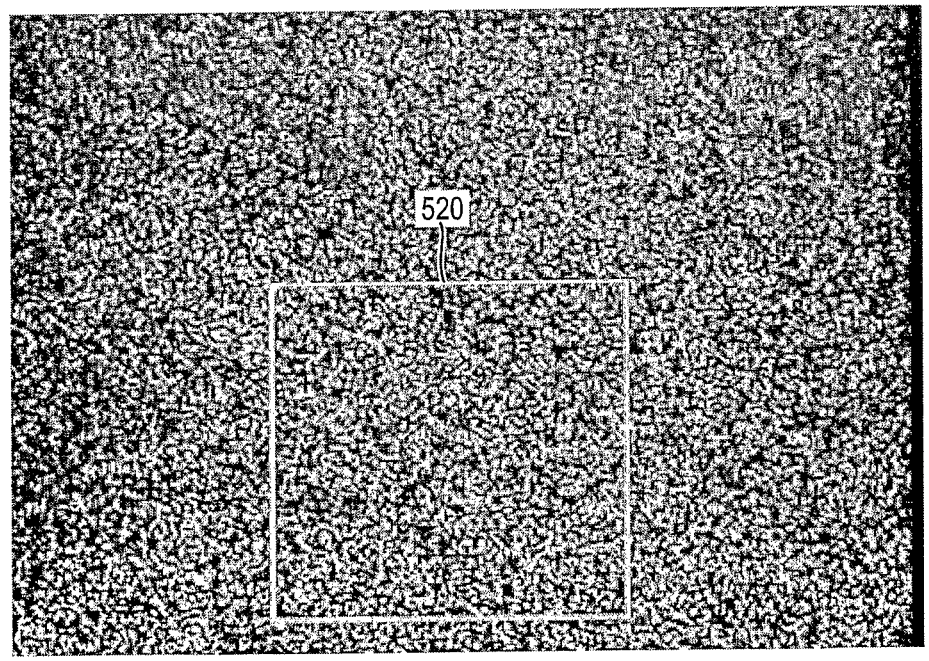

FIGS. 10a and 10b show a speckle pattern image generated using a displacement sensor similar to that shown in FIGS. 4a and 4b, with a National Semiconductor LM9637 CMOS imager used as the detector 160, which provides a 672 by 488 array of 8-bit pixels. As shown in the figure, some other pixels at the right hand edge of the LM9637 CMOS imager are not used as imaging pixels, but are usable for certain calibration operations related to the LM9637 CMOS imager. FIG. 10b shows the location of a 256×256 pixel address window 520 selected according to the above described method of FIG. 9. The location of the pixel address window 520 may be determined either automatically by the system operating the method described above, or it may be determined by an operator who simply chooses the location within the image which appears to have a good combination of high intensity, uniform intensity, and good contrast.

Figure 11:
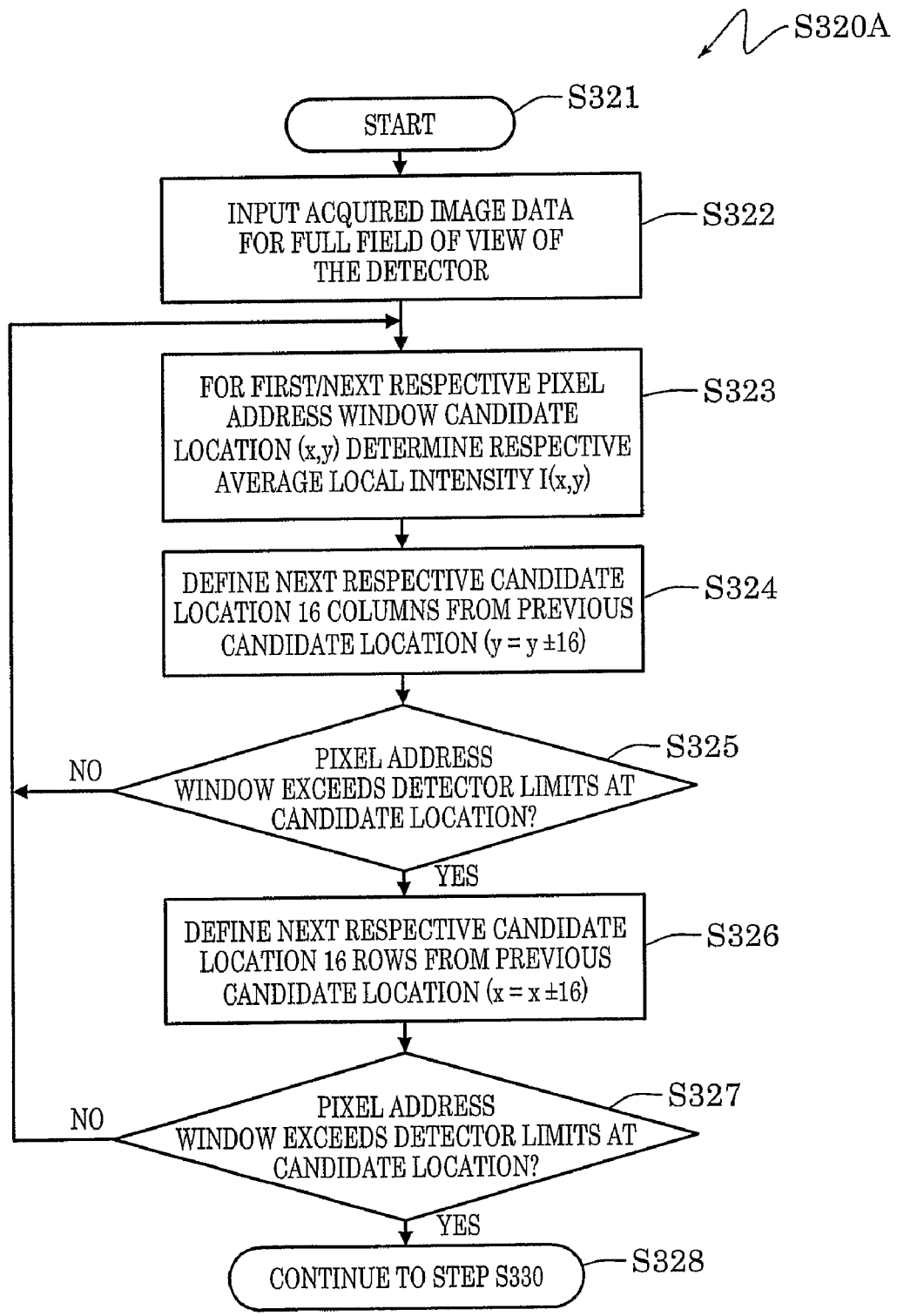
FIG. 11 shows in further detail one exemplary method for implementing step S320 of the flow chart of FIG. 9.

FIG. 11 shows one exemplary set of operations S320A usable for the step S320 of FIG. 9. The set of operations begins at step S321, and continues at the step S322 by inputting the data of an acquired image that approximately, or completely, covers the full field of view of the detector array. This maybe the image acquired in the step S200 of FIG. 8, for example. Next, in step S323, a first or next intensity sampling window of pixels is selected in the image, and the average intensity within this window is calculated and stored. The intensity sampling window is chosen to be the same size as the pixel address window, which is 256×256 pixels in this example. Thus, each respective intensity sampling window may also be regarded as a respective pixel address window candidate at a respective candidate location on the detector array. The candidate location may be represented by a respective set of (x, y) pixel address coordinates.

Next, operations continue to step S324 where the next respective pixel address window candidate location is defined. In the operations shown in FIG. 11, the location of the first respective pixel address candidate is in the corner of the detector array which has the lowest-valued pixel address coordinates. Then in step S324 the next respective pixel address window candidate location is defined by incrementing (or decrementing) the pixel address "column values" by 16 pixels. Of course, this increments (or decrements) the y value of the respective set of (x, y) pixel address coordinates that represent the current candidate location by 16. In general, the y values may initially be incremented until the y address exceeds the maximum y address in the detector array, and then the y values are decremented until the y address is less than the minimum y address in the detector array, and so on. Next, in step S325, it is determined whether any portion of the currently defined pixel address window falls outside of the extents of the image. If the entire currently defined pixel address window falls within the image, operations continue with the step S323, which determines the respective average local intensity for the "next", that is, the currently defined, pixel address window candidate location. Otherwise, if any portion of the currently defined pixel address window falls outside of the extents of the image, the currently defined pixel address window location is abandoned, and operation continues to the step S326.

At the step S326 the next respective pixel address window candidate location is defined by incrementing the pixel address "row values" by 16 pixels. Then, in step S327, it is again determined whether any portion of the currently defined pixel address window falls outside of the extents of the image. If the entire currently defined pixel address window falls within the image, operations continue with the step S323, which determines the respective average local intensity for the "next", that is, the currently defined, pixel address window candidate location. Otherwise, if any portion of the currently defined pixel address window falls outside of the extents of the image, the entire image has been analyzed, and the currently defined pixel address window location is abandoned. The process then returns to step S330, wherein the previously determined average intensity values for each respective pixel address window candidate are analyzed to determine the region that has the best or sufficient average local intensity and/or uniformity of the average local intensity.

Of course, the intensity sampling window and/or the pixel address window may have sizes other than the 256×256 pixels. However, it is generally most convenient if the size of the intensity sampling window corresponds to the size of the desired pixel address window.

Figure 12:
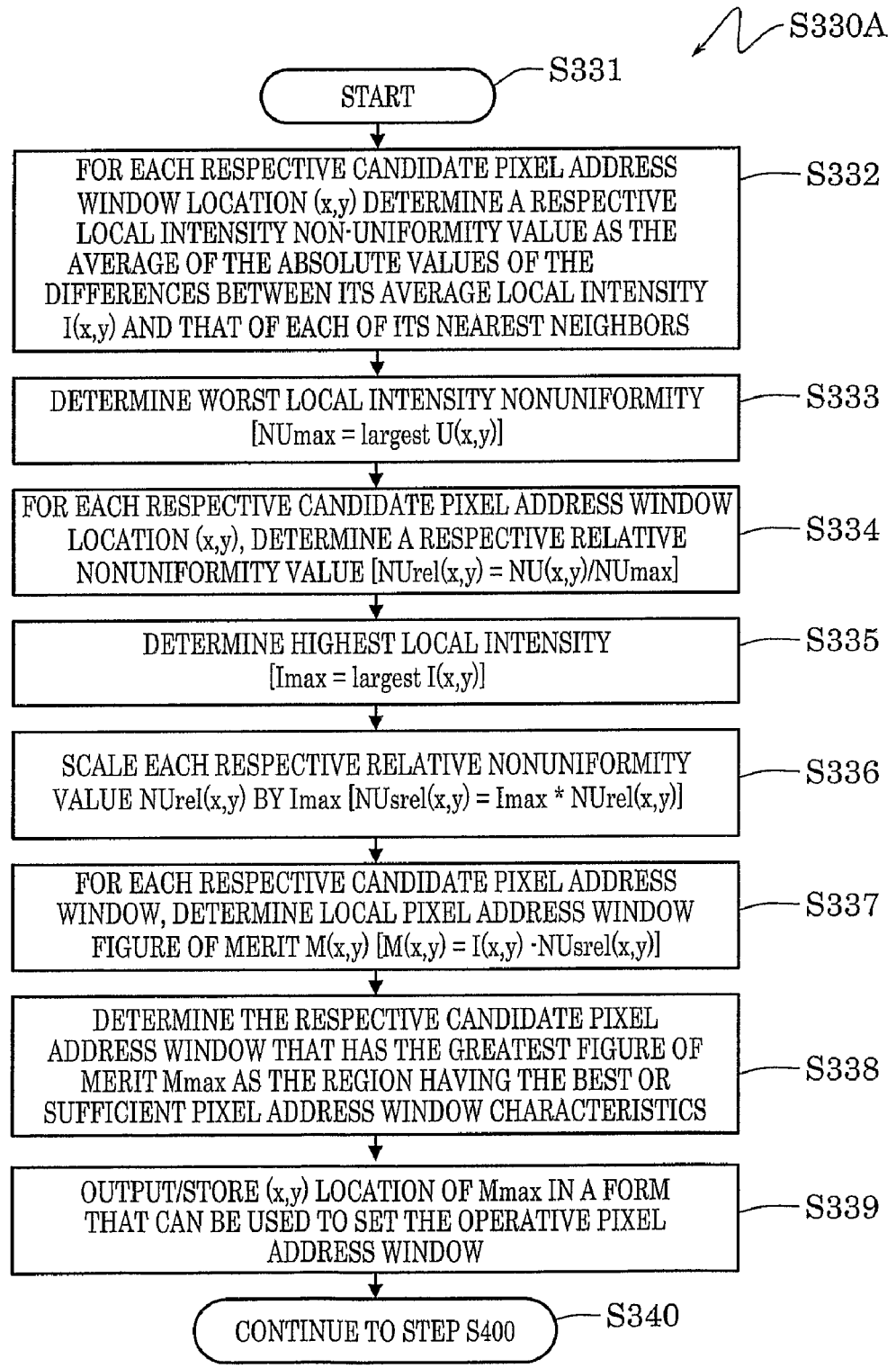
FIG. 12 shows in further detail one exemplary embodiment of step S330 of the flow chart of FIG. 9.

FIG. 12 shows one exemplary set of operations S330A usable for the step S330 of FIG. 9. In general, this set of operations employs a figure of merit that combines both image intensity and image intensity uniformity information, in order to indicate whether a particular candidate pixel address window has a best or sufficient combination of correlation image characteristics. This set of operations is particularly well suited for use in conjunction with the operations S320A of FIG. 11. The set of operations S330A starts in step S331 and proceeds to step S332, wherein a local intensity non-uniformity value is determined for each respective candidate pixel address window location, for example, based on the set of average local intensity values provided by the set of operations shown in FIG. 11. As previously described, according to the set of operations shown in FIG. 11, the average local intensity values are available for each of the respective candidate pixel address window locations that are spaced apart by 16 pixels along both the row and column directions of the detector array. This set of respective candidate pixel address window locations may be referred to as candidate locations on a location grid. As a first step in determining the figure of merit referred to above, for each respective candidate location on the location grid, the operations of step S332 determine a set of absolute values of the differences between the average intensity value corresponding to that candidate location and the average intensity values corresponding to each of its x and y direction neighbors on the location grid. The average of this set of absolute values is then determined. Each such average may be referred to as a non-uniformity value. It should be apparent that a low non-uniformity value corresponds to a relatively high degree of intensity uniformity at that respective candidate location, such as the relatively high degree of intensity uniformity that occurs near the central portion of a Gaussian image intensity distribution, as previously described. Conversely, a high non-uniformity value corresponds to a relatively low degree of intensity uniformity at a respective candidate location, such as the relatively low degree of intensity uniformity that occurs around the half-width-half-max of a Gaussian image intensity distribution.

In step S333, the highest average value (corresponding to the worst non-uniformity) out of all of the average values determined for all of the candidate locations on the location grid, is determined, for use in the following step. In step S334, a relative, or "normalized", non-uniformity value is determined for all of the candidate locations on the location grid, by dividing each previously determined non-uniformity value by the highest non-uniformity value (which was determined in the step S333.) In step S335, the highest average local intensity is determined out of all of the average intensity values determined for all of the candidate locations on the location grid. It should be appreciated that a relatively higher average intensity value is generally preferred for correlation image calculations, for reasons previously described.

In step S336, the relative, or "normalized", non-uniformity values determined in step S334 are scaled by the highest average local intensity determined in step S335. The scaling may simply be the multiplication of the relative non-uniformity values determined in step S334 by the highest average local intensity determined in step S335. It should be appreciated that for relatively high non-uniformity values that approach a value of one, the scaling will produce a value that approaches is the highest average local intensity determined in step S335. Conversely, for relatively low non-uniformity values (that is, values reflecting regions of high uniformity) that approach a value of zero, the scaling will produce a value that approaches zero. In essence, the purpose of this step is to provide a value that is roughly comparable to the respective average local intensity values at the various locations on the location grid, but that is also strongly influenced by the respective non-uniformity associated with those various locations on the location grid.

Next, in step S337, for each respective location on the location grid, that is, for each respective candidate pixel address window location, the figure of merit is determined. The figure of merit is determined for each respective location by subtracting the scaled relative non-uniformity value determined for that location in step S336 from the respective average local intensity previously determined for that location. In general, higher values of the figure of merit reflect a respective high local intensity and a relative non-uniformity value of approximately zero (which occurs in regions of high uniformity). Increasingly poorer values for the figure of merit becoming increasingly smaller, as the respective local intensity value decreases and as the relative non-uniformity value of approaches one (which occurs in regions of poor uniformity). Accordingly, it should be apparent that, in the case of a Gaussian illumination beam, the best possible values for the figure of merit, that is, the "most positive" of the values for the figure of merit, will tend to occur at respective locations on the location grid that approximately coincide with the relatively uniform and high image intensity regions corresponding to the central portion of the Gaussian image intensity distribution, as previously described with reference to FIGS. 7A-7B. However, this figure of merit also works well for various other illumination beam intensity profiles and the resulting image intensity distributions.

In step S338, in one example the respective location on the location grid that corresponds to the respective pixel address window that may have the best value for the figure of merit, that is, the "most positive" of the values for the figure of merit, is determined. In another example, the first respective location on the location grid that corresponds to the respective pixel address window that is determined to have sufficiently good correlation image characteristics, as indicated by a "sufficiently positive" value for the figure of merit, is determined. A value for the figure of merit which corresponds to "sufficiently good" correlation image characteristics may vary and/or depend on the measurement resolution requirements in various applications, and may be determined based on experience and/or specific experiments, in any case.

In step S339, the location of the location grid having the best or sufficient pixel address window characteristics, as determined according to the location corresponding to the best or sufficient figure of merit determined in step S338, is stored and/or output, such that it is usable to define the location of the operative pixel address window. In step S340, the process returns to step S400 of FIG. 8, wherein the location of the operative pixel address window is actually defined or set to be used in ongoing displacement measurement operations of the optical position transducer.

Figure 13:
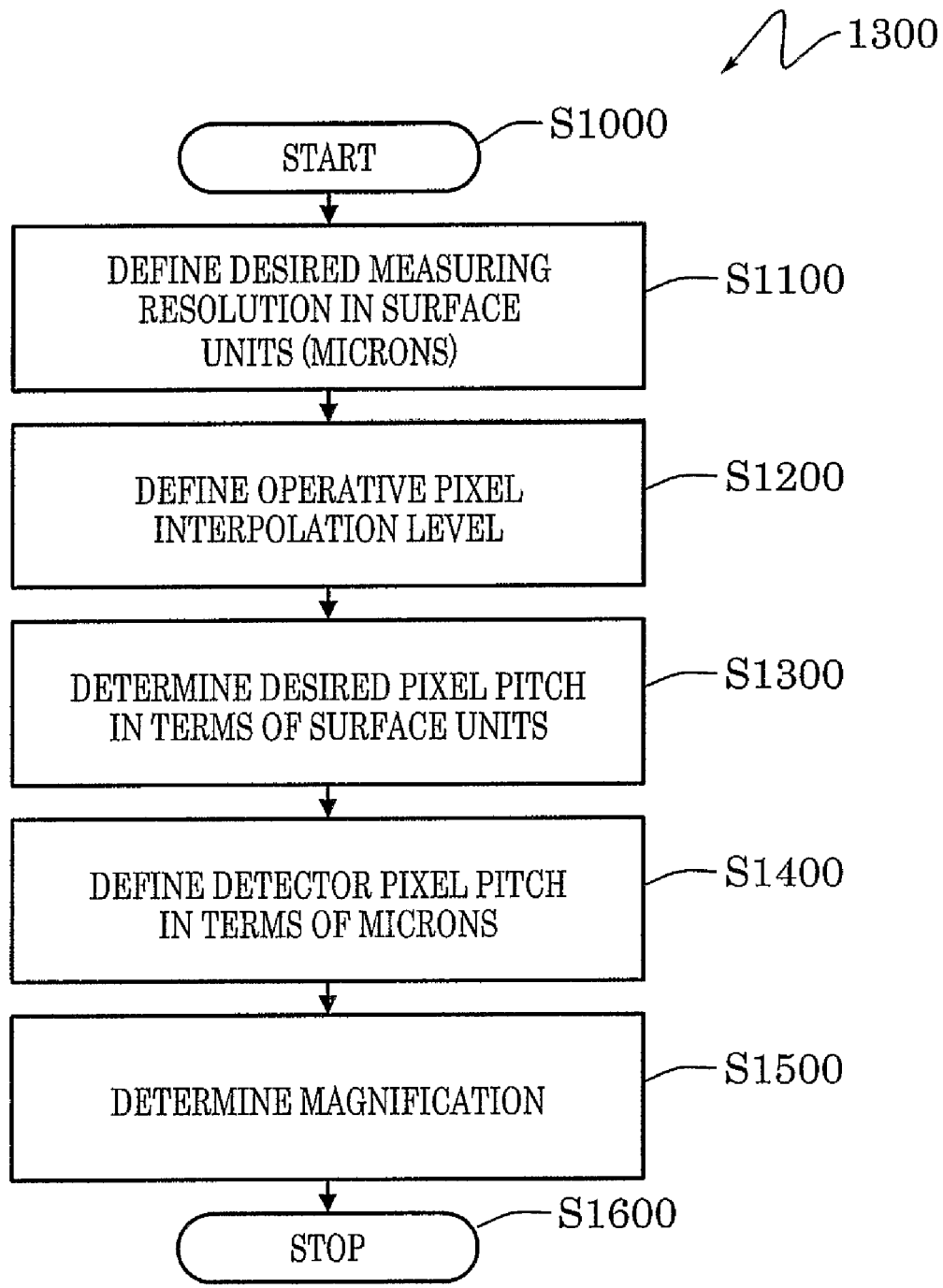
FIG. 13 is a flowchart illustrating one exemplary method for determining a magnification usable in an optical position transducer.

One exemplary method 1300 for determining a magnification to be used in the optical position transducer is shown in the flow chart of FIG. 13. The method starts at step S1000, and proceeds to step S1100, wherein a desired resolution is defined in terms of surface units, for example, in um of displacement of the target surface. In step S1200, the operative interpolation level to be used in the optical position transducer is specified. This specification is a design choice, which may generally be based on consideration of the information included in the chart shown in FIG. 6 (for purposes of this discussion, the interpolation level is the accuracy of the subpixel image correlation operations, in terms of a fraction of a pixel, and thus has the same dimensions as the "fraction of pixel pitch" values shown in FIG. 6) and the ease and/or reliability of achieving a particular interpolation level, tradeoffs between the pixel address window size needed to provide a number of correlation pixels that supports a desired interpolation level and the associated required detector area, the desired displacement measurement rate and the related allowable displacement motion speed, and the like. The interpolation level may simply be chosen as the interpolation level associated with approximately "3 standard deviation" measurement reliability for a 128×128 pixel correlation area, which is one desirable pixel correlation area for reasons described previously with reference to FIG. 6. As indicated by the curves shown in FIG. 6, for one exemplary optical displacement sensor, the "3 standard deviation" measurement reliability level for a 128×128 pixel correlation area is approximately 0.004, that is, 1 pixel/250.

Based on the two parameters defined in the previous two steps, in step S1300 the desired or required pixel pitch in terms of "imaged surface units" (that is, in terms of a surface displacement measurement unit as imaged onto the detector array) may be determined by dividing the desired measurement resolution by the defined interpolation level, as indicated below in Table 1, for one exemplary set of parameters.

In step S1400 the actual detector pitch (in μm/pixel) is defined. This is a characteristic of the selected detector array; for example, the detector array physical pixel pitch may be 6 μm/pixel, as indicated in Table 1.

In step S1500 the magnification is determined based on the two parameters determined in the previous two steps, by dividing the physical pixel pitch by the determined pixel pitch in terms of surface units, as indicated below in Table 1, for one exemplary set of parameters. The process ends in step S1600.

The magnification, along with the size of the pixel address window and the pixel correlation area discussed above, nominally govern the range that target surface can move relative to the measurement device without requiring that the reference image be updated. In general, a greater range can be obtained by reducing the resolution requirements of the measurement, which allows a lower magnification value. In general, the resolution is the primary figure of merit of the optical position transducer 100, and the range is a secondary figure of merit.

Table 1 below summarizes the magnification requirements to perform a 4 nm resolution measurement, using a detector with a physical pixel pitch of about 6 μm per pixel. The values specified in Table 1 assume one exemplary subpixel interpolation level of 1 pixel divided by 250, which can achieved with approximately a "3 standard deviation" reliability one using a pixel correlation area of approximately 128×128 pixels according to the curve illustrated in FIG. 6.

TABLE 1

| Measurement resolution | 4 nm = 0.004 μm |
|---|---|
| Interpolation level | 1/250 (1 pixel/250) |
| Pixel pitch in surface units | 1.0 surface μm/pixel |
| Physical pixel pitch | 6 μm/pixel |
| Magnification | 6.00 |

Figure 14:
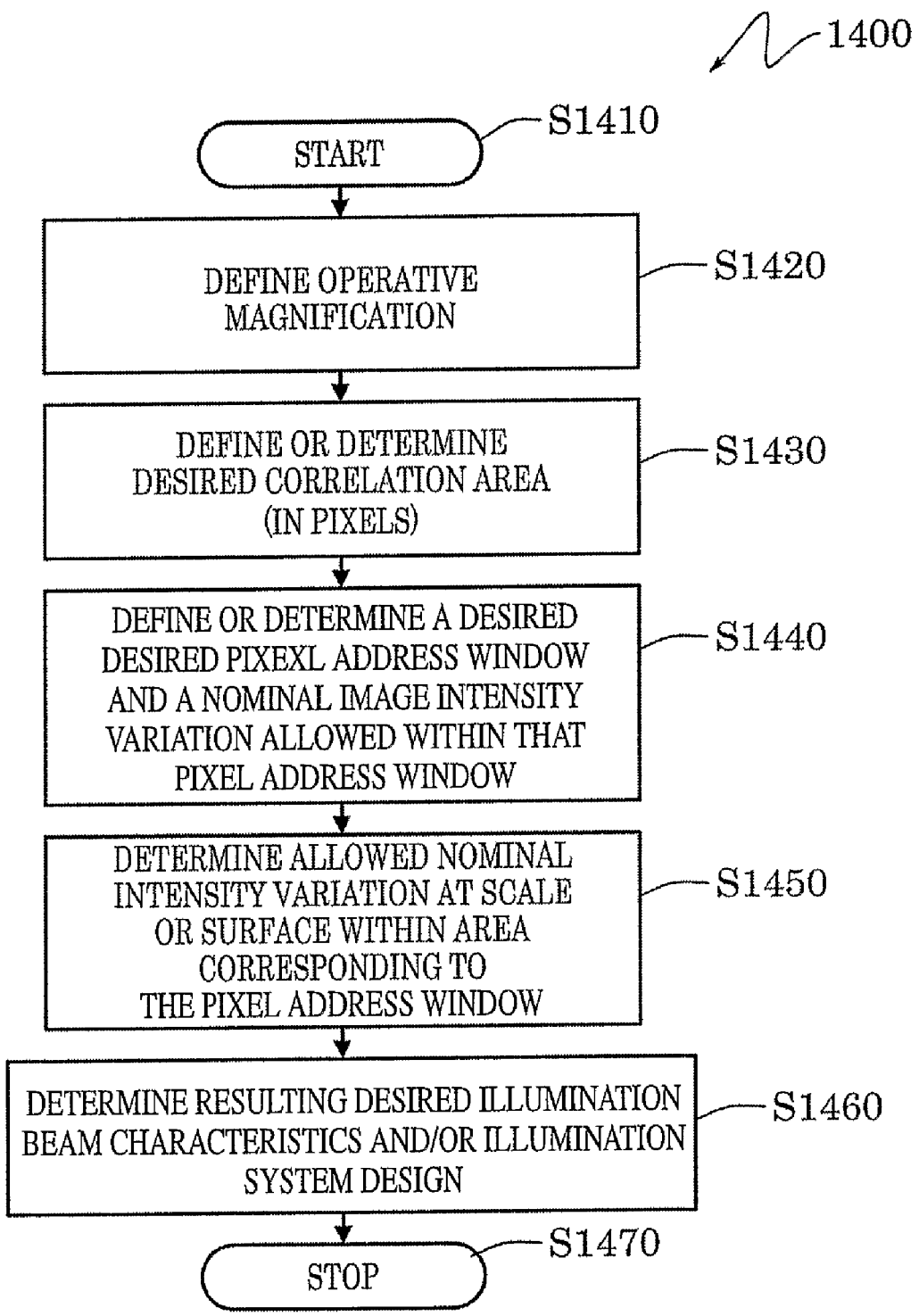
FIG. 14 is a flowchart illustrating one exemplary method for designing an illumination system for providing relatively uniform illumination in an optical displacement transducer.

As previously indicated, more reliable image correlation results are generally obtained when the image intensity is more uniform throughout the reference and current correlation images. Image intensity uniformity can be enhanced by providing relatively uniform illumination. One exemplary method 1400 for designing an illumination system that provides relatively uniform illumination in an optical displacement transducer is illustrated in FIG. 14. The method 1400 begins in step S1410, and continues to step S1420, wherein the operative magnification is defined, using, for example, the results of the operations shown in FIG. 13.

In step S1430, the pixel correlation area is defined or determined in terms of a desired number of correlation pixels. As previously outlined with reference to the step S1200 shown in FIG. 13, and as indicated by the curve shown in FIG. 6, the number of correlation pixels is closely related to the achievable subpixel interpolation level. Thus, in some situations, the number of correlation pixels and the associated pixel correlation area may be determined as a design choice in conjunction with the choice of a desired subpixel interpolation level, according to previously described considerations. In other situations, the number of correlation pixels and the associated pixel correlation area may be determined as needed to achieve a previously established subpixel interpolation level, according to previously described considerations and relationships. In yet other situations, a 128×128 pixel correlation area, which is one desirable pixel correlation area for reasons described previously with reference to FIG. 6, may simply be defined as the desired correlation area. By analogy with previous discussions, a 128×128 pixel correlation area generally provides a "3 standard deviation" reliability level for subpixel interpolation level of approximately 0.004, that is, 1 pixel/250.

In step S1440 a desired pixel address window is determined or defined along with a nominal allowed intensity variation over that pixel address window. Generally the desired pixel address window may be determined in dependence on the pixel correlation area defined or determined in the step S1430. For example, following one possible design guideline previously described, the desired pixel address window may be chosen to have dimensions that are two times the dimensions of a desired pixel correlation area. For example, in such a case, when the desired pixel correlation area is 128×128 pixels, the desired pixel address window area is 256×256 pixels. However, more generally, the dimensions of the pixel address window and the pixel correlation area may be determined to have any other design relationship which is operable or desirable for a particular application, with due consideration the both the desired resolution and the desired range that is allowable without updating the reference image.

Regardless of the dimensions of the pixel address window, for approximately the best possible interpolation accuracy, the overall image intensity distribution in the pixel address window may be uniform within approximately 20% of the maximum of the overall image intensity distribution in the pixel address window (that is, to be at least 80% of the maximum of the overall image intensity distribution in the pixel address window), which is a good rule of thumb for obtaining good accuracy and good subpixel interpolation results such as those shown in FIG. 6. However, as previously described with reference to FIG. 7D, a lesser amount of intensity uniformity may be allowed in the pixel address window, and an operable position sensing device with very little degradation in measurement accuracy and/or resolution will still result. Thus, more generally, the allowed overall image intensity variation in the pixel address window may be determined based on experience, experiment, or analysis, in order to provide a desired level of measurement accuracy and resolution for a particular application.

Regardless of the determined or defined allowed nominal image intensity variation in the pixel address window in step S1440, in step S1450, the nominal image intensity variation allowed in the pixel address window on the detector surface is translated, via the magnification factor, into the maximum nominal illumination intensity variation allowed across the portion of the target surface that is nominally imaged into the pixel address window, which may be referred to as the desired surface illumination distribution. For example, using the exemplary values shown below in Table 2, when the pixel address window area is 256×256 pixels, the pixel pitch is 6 μm/pixel and the magnification value is 6.0, the portion of the target surface that is nominally imaged into the pixel address window has a diagonal dimension of approximately [1.414*256 pixels*6 μm/pixel]/6.0=[2,172 μm]/6.0=362 μm.

Thus, if the desired overall image intensity distribution in the pixel address window is to be everywhere at least 80% of the maximum of the overall image intensity distribution in the pixel address window, the desired surface illumination distribution is to be everywhere within a diameter of 362 µm at least 80% of the maximum of the overall image intensity distribution within the diameter of 362 µm.

In step S1460, the desired surface illumination distribution determined in step S1450 is used to determine the corresponding, or resulting, desired illumination beam characteristics, and/or an illumination system design that provides the desired illumination beam characteristics. It should be appreciated that the desired surface illumination distribution can be translated, via the known geometric effects associated with the angle of incidence of the illumination beam, into a desired beam intensity profile across the cross-section of the illumination beam. However, for at least some of the various displacement transducers described above, it is reasonable and sufficient if the illumination beam profile is substantially the same as the desired surface illumination distribution. Accordingly, if, for example, the desired surface illumination distribution is to be everywhere within a diameter of 362 µm at least 80% of the maximum of the overall image intensity distribution within that diameter of 362 µm then it is reasonable and sufficient if the illumination beam profile is a Gaussian beam profile wherein the 80% level of the Gaussian beam profile occurs at a radius of 362 µm/2=181 µm from the center of the illumination beam profile. In step S1470 the method ends.

TABLE 2

| | |
|---|---|
| Magnification | 6.00 |
| Pixel address window dimensions | 256 × 256 pixels |
| Physical pixel pitch | 6 µm/pixel |
| Pixel address window diagonal dimension | 1.414*256*6 µm = 2,172 µm |
| Approximate "80%" illumination diameter on surface and in the illumination beam profile | 2,172 µm/6.0 = 362 µm |

Figure 15B:
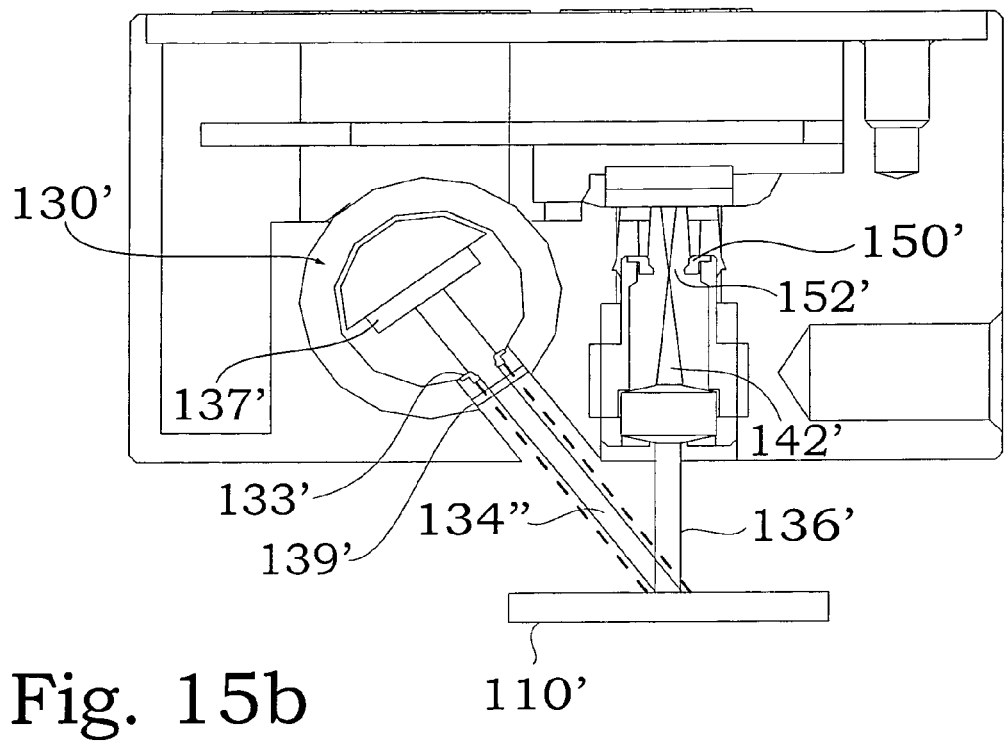
FIGS. 15A and 15B show one exemplary optical system using an illumination system with an optical arrangement that limits the amount of extraneous radiation power emitted from an optical displacement transducer.
Figure 15A:
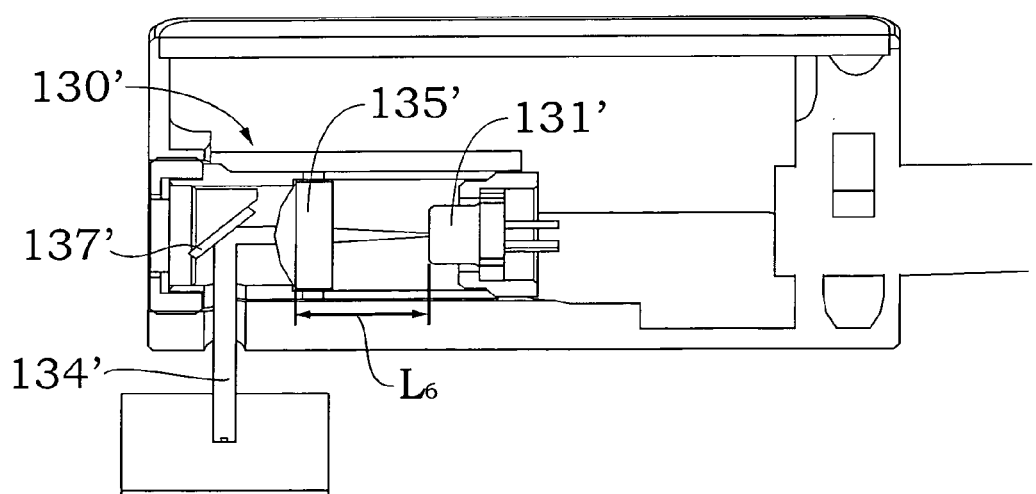

To provide one example of various illumination system design considerations related to providing a desired illumination beam intensity profile, also referred to simply as the beam profile, FIG. 15a shows a side view of the optical position transducer shown in the FIGS. 4a and 4b, at a different cross-section than the cross-section shown in FIG. 4a. The cross-sectional side view shown in FIG. 15a shows certain elements of one exemplary light source 130', also referred to as the illumination system 130', that can be used in the optical position transducer. We start by assuming that in a speckle type optical displacement sensor, a laser diode may be used as a light emitter 131'. In general, it is common for a laser diode to emit a diverging beam having a Gaussian intensity profile. It is generally desirable, with regard to both regulatory considerations and sensor power considerations, to reduce the power included in the illumination beam as far as possible and/or practical. Thus, to provide the highest possible illumination intensity at the surface for a given illumination beam power, it is advantageous for the illumination system to include a lens 135' that causes the diverging laser diode beam to become approximately collimated or slightly converging. However, it should be appreciated that the resulting illumination beam 134' retains a Gaussian beam profile, unless it is otherwise altered. It is generally advantageous to avoid making the illumination beam strongly converging because then slight variations in the gap between the target surface 110' and the optical sensor will cause relatively large and undesirable variations in the width and the associated illumination intensity of the illumination beam at the target surface 110'.

The diverging emitted light allows the distance $L_6$ between the light emitter 131' and the approximately collimating lens 135' to be set to provide a desired illumination beam diameter or radius. Thus, consistent with an example outlined above, if the desired illumination beam profile is a Gaussian beam profile wherein the 80% level of the Gaussian beam profile occurs at a radius of 181 µm from the center of the illumination beam profile, the distance $L_6$ may be set based on experiment, analysis, or simulation, to provide this desired illumination beam profile. As shown in FIG. 15a, a turning mirror 137' may be used in the illumination system, so that the light emitter 131' and the lens 135' may be located along a direction in the compact displacement sensor such that there is sufficient room to extend the distance $L_6$ to a desired practical dimension.

FIG. 15b shows an end view of the optical position transducer shown in the end view of FIG. 4b, and the side view of FIG. 15a, but it illustrates some additional optional illumination system elements that may be used advantageously. In particular, an illumination beam aperture 133' and an illumination beam profile altering element 139' are shown, which may be used independently, or in conjunction, in various alternative displacement transducers.

As previously mentioned, it is generally desirable, especially with regard to both "eye-safe" regulations applicable to devices that emit a laser beam, to reduce the power included in the illumination beam as far as possible and/or practical. Towards this end, the illumination beam aperture 133' may be used in some applications where only the 80% central portion of the illumination beam is used to provide the correlation images, as outlined in various examples above. In particular, the illumination beam aperture 133' may be dimensioned to prevent the portion of the Gaussian illumination beam that falls outside of the "80%" central portion from being included in the emitted illumination beam. Thus, relatively more power may be used concentrated on the imaged portion of the target surface, for a given "eye-safe" regulation limit. For example, since approximately one half of the optical power a Gaussian beam profile falls outside of the 80% central portion, as a simple approximation, ideally, the power that may be concentrated on the imaged portion of the target surface may be increased by up to approximately a factor of two, for a given "eye-safe" regulation limit. However, it should be appreciated that, for various combinations of illumination beam distance (or length to the surface) and aperture size, diffraction effects may actually destroy the desired uniformity at the target surface 110', and thus prevent the use of this approach. However, for certain combinations of illumination beam distance or length to the surface and aperture size, various diffraction effects may advantageously combine to provide approximately the desired effect outlined above. In any case, whether or not one of these advantageous combinations of illumination beam length to the surface and aperture size can be achieved in combination with various other application-specific displacement sensor design and mounting constraints, may be determined by experiment, analysis, or simulation by one skilled in the art of optical design.

With regard to the illumination beam profile altering element 139', commercial sources for designing and/or producing standard and custom miniature diffractive optical elements (DOE's), that are usable for altering an illumination beam profile and increasing its uniformity, are increasingly available. For example, one such source is Digital Optics Corporation, 9815 David Taylor Drive, Charlotte, N.C., USA. Applicable DOE design techniques are also described in MICRO-OPTICS: Elements, Systems and Applications, Edited by Hans Peter Herzig. Taylor & Francis, London, 1970, and Methods for Computer Design of Diffractive Optical Elements, Edited by Victor A. Soifer. Wiley-Interscience; John Wiley and Sons, Inc., New York, 2002, which are incorporated herein by reference. The illumination beam profile altering element 139' may be a DOE that alters a Gaussian beam profile, to provide a so-called "top-hat" beam profile, which is a beam profile wherein the illumination intensity is uniform across approximately the entire diameter of an illumination beam.

In the case of a conventional imaging type optical displacement transducer, the light emitter 131' may be a light emitting diode that emits incoherent illumination having a rather non-uniform and imprecisely defined beam profile. In such a case, the illumination beam profile altering element 139' may be a DOE that converts the non-uniform beam to a relatively homogeneous or uniform beam according to known DOE design techniques. The sources and incorporated references described above may also be used to provide DOE's that alter a beam profile in this manner. As previously mentioned, an illumination beam aperture 133', and any of the profile altering elements 139' described above, may be used independently, or in conjunction, in various alternative optical displacement transducer illumination system designs.

FIG. 16 is an illustration that clarifies various previously described relationships between an exemplary 128×128 pixel correlation area and an exemplary 256×256 pixel address window, as well as illustrating one method of rapidly estimating an approximate correlation peak location based on the best correlation location of a relatively small coarse search template. In the example described here, as shown, the coarse search template 640 is a 16×16 block of image pixels extracted from a set of known pixel addresses at the center of a reference image 620. As shown in FIG. 16, the reference image 620 is a 256×256 pixel image previously acquired in an operative 256×256 pixel address window, which has a location on the detector determined as previously described. Also shown is a current image 630 representing an image of a surface displaced relative to the reference image 620. The current image 630 is also a 256×256 pixel image acquired in the operative 256×256 pixel address window.

In order to increase the rate at which the reference in current image are correlated, the 128×128 pixel correlation area 610 is not used initially. Rather, the system systematically steps the 16×16 coarse search template 640 in one pixel increments throughout each location in the current image 630 and determines a correlation value at each location. This operation may be performed rapidly due to the small size of the coarse search template 640. The location of the peak correlation value for the coarse search template in the current image is then determined by the system using methods taught in incorporated references or by any other suitable now known, or later developed method.

With reference to FIG. 16, it should be appreciated that if there were no surface displacement between a reference and a current image, because the coarse search template was extracted from the center of the reference image 620 the location of the peak correlation value for the coarse search template would likewise be in the center of the current image 630, as indicated by location 660 shown at the center of the current image. However, for the example shown in FIG. 16, the location of the peak correlation value for the coarse search template in the current image is near the edge of the current image at the location 650. Thus, it is apparent that the imaged surface has been displaced by an amount approximately corresponding to the surface displacement vector shown in FIG. 16. The surface displacement vector can readily be determined based on the location of the peak correlation value in the current image and the location of the set of known pixel addresses from which the coarse search template was extracted in the reference image, according to known methods.

As indicated in FIG. 16, the respective portions of the reference image 620 and the current image 630 that will best correlate, that is the respective portions of the reference image 620 and the current image 630 that image the same portion of the surface, will be those respective portions of the reference image 620 and the current image 630 that are approximately congruent with the 128×128 pixel correlation area 610 centered at the location at the midpoint 670 of the surface displacement vector. Thus, the precise displacement measurement determinations based on correlating the full 128×128 pixel correlation area, may start with initial pixel address offset values corresponding to these respective portions of the reference and current images, and need only search in a limited range around these initial pixel address offset values in order to determine the location of the 128×128 peak correlation value according to methods disclosed in incorporated references, or any other now known, or later developed, method. Thus, based on the foregoing sequence of approximate, and then precise, correlation determinations, the overall full-precision correlation-based displacement measurements may be performed at a high rate. Commonly assigned U.S. patent applications Ser. Nos. 09/921,889 and 09/921,711 disclose other methods for performing approximate, and then precise, correlation determinations such that the overall full-precision correlation-based displacement measurements may be performed at a high rate, and they are hereby incorporated by reference in their entirety, for all of their relevant teachings. However, simpler, more conventional, exhaustive high-precision correlation search methods may be employed if when correlation-based displacement measurements need not be performed at a high rate, or when a conventionally imaged absolute code scale is used, or the like.

The size of the pixel correlation area 610 is, in the example shown in FIG. 16, one-half of the size of the pixel address window 620. Therefore, this minimum size (minus one-half of the 16×16 coarse search template=8 pixels) determines the maximum amount of surface displacement which can be tolerated between the first stored reference image 620 and the second stored current image 630. Therefore, as shown in FIG. 16, the reference image 620 and the current image 630 may be separated by no more than a distance corresponding to one-half of the pixel address window 620 minus 8 pixels for the coarse search template, which is 120 pixels. This requirement sets an upper bound on the displacement range which can be measured without updating the reference image, or the maximum allowed speed of the surface 110 beneath the readhead, times the sample time interval. For example, if the pixel pitch is 1 μm and the magnification is 1, the range or maximum amount of surface displacement allowed between the first stored reference image 620 and the second stored image 630 is 120 μm. However, more generally, it should be appreciated that the range in terms of surface displacement is reduced in proportion to the magnification with which the target surface is imaged onto the surface of the detector array 160.

Figure 17:
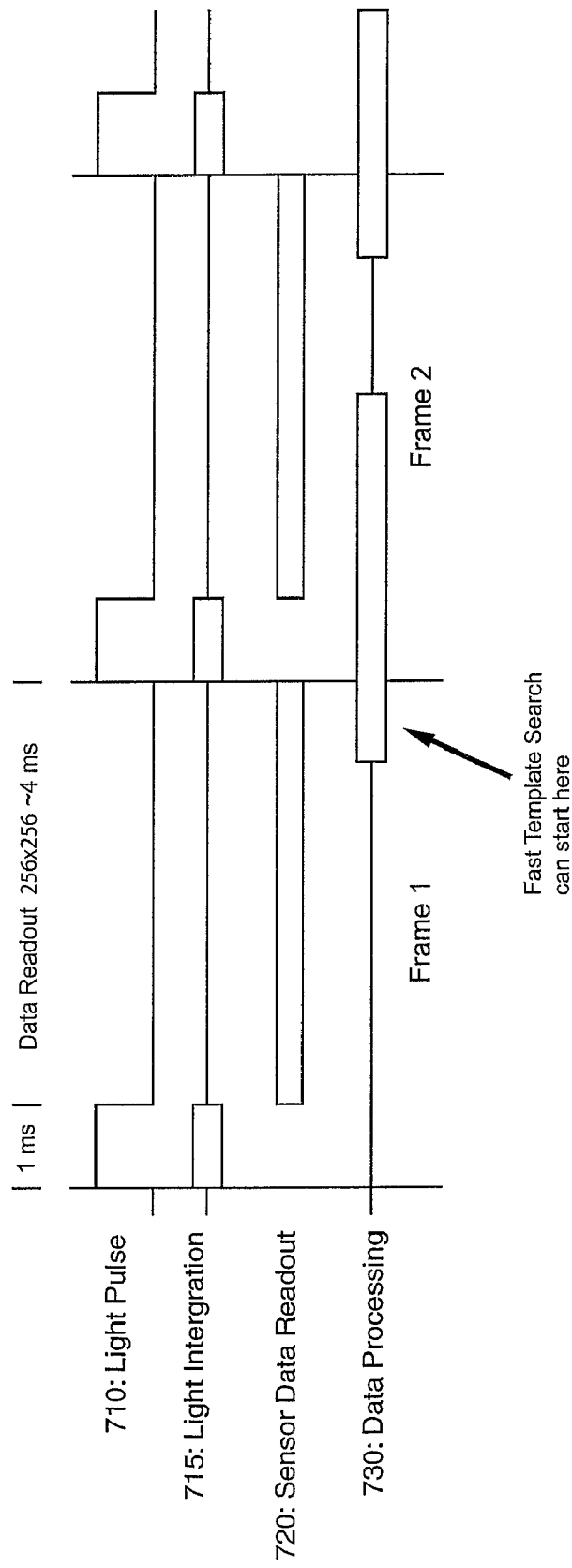
FIG. 17 illustrates one exemplary timing diagram for a displacement sensor.

FIG. 17 is a timing diagram illustrating various aspects of the functioning of the optical position transducer. The figure indicates that the displacement transducer sampling rate is generally dominated by the image data readout time 720 which in one exemplary implementation consumes approximately 4 milliseconds (ms) of a 5 ms displacements measurement sample time, in order to readout a 256×256 set of pixel address window pixels. An additional 1 ms is taken for the light integration time 715, which is the image exposure time during which the image light input is integrated by the pixels of the detector array. The light pulse time 710, during which the light source is activated to illuminate the target surface, coincides with the light integration time 715. The inventors have found that when using an eye-safe level of power in the illumination beam a 1 ms approximately a minimum illumination and exposure time required to achieve a signal level from the detector elements that supports relatively high levels of sub-pixel interpolation, such as those illustrated by the curve of FIG. 6. Using a time much shorter than 1 ms deleteriously reduces the signal level on the light-sensitive detectors, whereas using an illumination time much in excess of 1 ms may saturate the elements. Therefore, approximately a 1 ms illumination time is required an eye-safe beam power level for adequate performance. However, if the techniques previously described with reference to FIG. 15b are implemented, in order to increase intensity of the illumination light beam falling on the portion of the target surface that is imaged onto the pixel address window, the illumination and exposure times can be shortened. Therefore, the techniques previously described with reference to FIG. 15b, can speed up (shorten) the light pulse and light integration times, while still staying within eye-safe illumination beam power limits.

Coincidentally, the image data processing time 730 consumes about 4 ms (similar to the 4 ms required for the 256× 256 image data readout) in order to process the reference and current images according to the techniques outlined above with reference to FIG. 16, including the use of a 128×128 pixel correlation area. FIG. 15 indicates that the most effective way to increase the displacement measurement sample rate is to decrease the image processing time and the sensor data readout time; as by this invention. Since, the time required for the data processing and the image data readout is approximately proportional to the number of pixels participating in the measurement, by reducing the number of pixels output participating according to this invention, the sample time of the optical position transducer device can be shortened.

Figure 18:
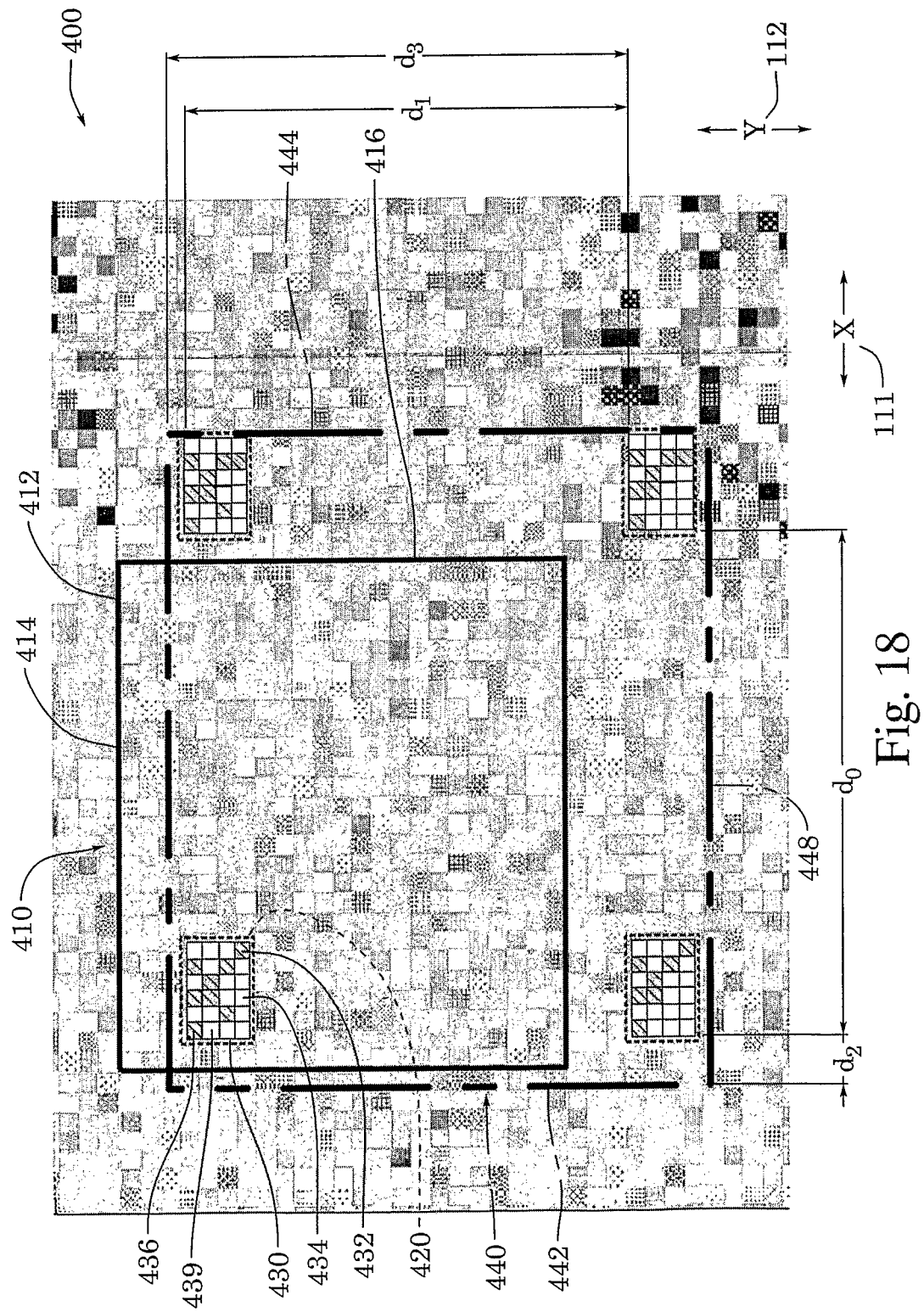
FIG. 18 shows a portion of one exemplary scale pattern usable to provide a conventional image that is usable in a two-dimensional absolute position displacement sensor.

FIG. 18 is a sample image illustrating the pattern of one exemplary scale which may be used with a conventional imaging displacement transducer. The 2D integrated absolute scale pattern 400 shown in FIG. 18 corresponds to the 2D scale pattern 300 shown in FIG. 1. The general characteristics and signal processing associated with absolute scale pattern 400 are described in detail in commonly assigned U.S. patent application Ser. No. 10/427,921, which is hereby incorporated by reference in its entirety, and the scale pattern 400 therefore need not be described in detail here. The various elements shown in FIG. 18 are labeled with the same reference numerals used in the incorporated '921 application, and may be understood with reference to that application. Generally, in order to use the absolute scale pattern 400 with the systems and methods disclosed herein, it is only necessary to consider the detection window 440 described in the '921 application and shown in FIG. 18 as having the characteristics and relationships described for the pixel address window herein, which may, in effect, be functionally substituted for the detection window 440. Other than this, the various dimensions $d_0$-$d_3$ are adjusted relative to the dimensions of the pixel address window, according to the same principles taught in the '921 application for adjusting the dimensions $d_0$-$d_3$ relative to the dimensions of the detection window 440 as described therein.

Figure 19:
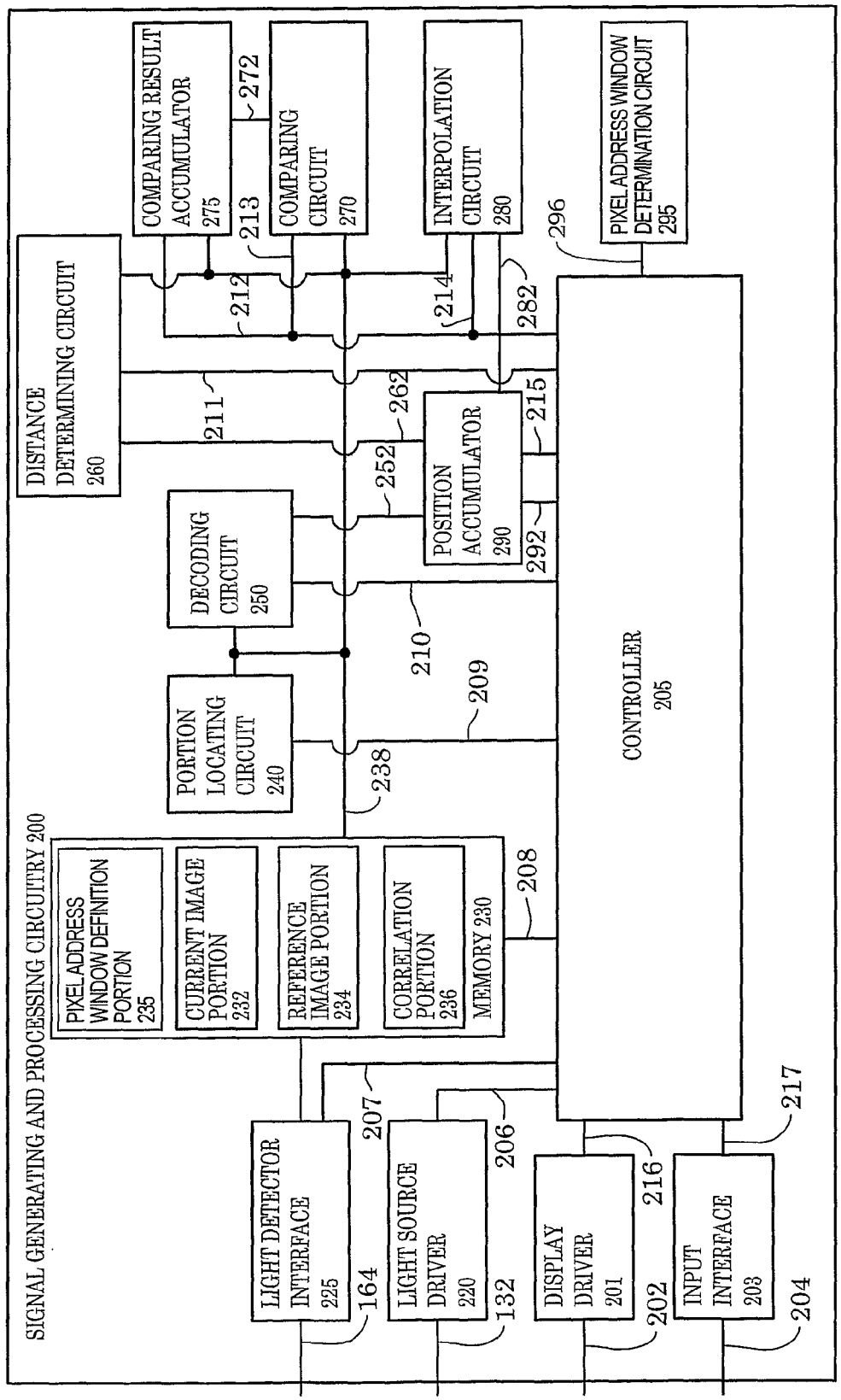
FIG. 19 is a block diagram outlining in greater detail the signal generating and processing circuitry of FIG. 1, which is usable to provide a position measurement in a displacement sensor.

FIG. 19 is a block diagram outlining in greater detail one exemplary embodiment of the signal generating and processing circuitry 200 shown in FIG. 1. As shown in FIG. 16, the signal generating and processing circuitry 200 includes a controller 205, a light source driver 220, a light detector interface 225, a memory 230, a portion locating circuit 240, a decoding circuit 250, a distance determining circuit 260, a comparing circuit 270, a comparison result accumulation 275, an interpolation circuit 280, a pixel address window determination circuit 295, a position accumulator 290, a display driver 201 and an optional input interface 203.

The signal generating and processing circuitry 200 can be applied either to a speckle-image displacement correlation sensor, or to an absolute displacement sensor. The exemplary embodiment of the absolute displacement sensor will be described below.

The controller 205 is connected to the light source driver 220 by a signal line 206, to the light detector interface 225 by a signal line 207, and to the memory 230 by a signal line 208. Similarly, the controller 205 is connected by signal lines 209-215 to the portion locating circuit 240, the decoding circuit 250, the distance determining circuit 260, the comparing circuit 270, the comparison result accumulator 275, the interpolation circuit 280 and the position accumulator 290, respectively. Finally, the controller 205 is connected to the display driver 201 by a signal line 216 and, if provided, to the input interface 203 by a signal line 217. The memory 230 includes a pixel address window definition portion 235, current image portion 232, a reference image portion 234 and a correlation portion 236.

In ongoing operation, the controller 205 outputs a control signal over the signal line 206 to the light source driver 220. In response, the light source driver 220 outputs a drive signal to the light source 130 over the signal line 132. Subsequently, the controller 205 outputs a control signal to the light detector interface 225 and to the memory 230 over the signal lines 207 and 208 to acquire data from those image pixel addresses defined in the pixel address window definition portion 235, and store the signal portions received over the signal line 164 from the light detector 160 corresponding to each of the image elements 162 into the current image portion 232. In particular, the image values from the individual image elements 162 are stored in a 2D array in the current image portion 232 corresponding to the positions of the individual image elements 162 in the array 166.

After the reference image is similarly acquired based on those image pixel addresses defined in the pixel address window definition portion 235 and stored in the reference image portion 234, the reference image is output over a signal line 208 to the controller 205.

The definition of the image acquisition addresses defined in the pixel address window definition portion 235 are determined by the pixel address window determination circuit 295, based on acquiring an image over a complete set of image acquisition addresses covering the entire field of view of the detector of the optical displacement transducer, and analyzing that complete set of acquired image data with the pixel address window determination circuit 295, which implements pixel address window determination systems and methods previously described herein, in order to determine a desirable pixel address window.

After a new current obtained image is acquired according to the foregoing procedures and is stored in the current image portion 232 of memory 230, the current obtained image is output over signal line 208 to the controller 205.

In one example, if the optical position transducer is operating as an absolute displacement measuring device, the pixel address window should contain the image of the scale surface, on which a scale code has been patterned. For example, a two-dimensional (2D) absolute displacement transducer operates on a surface on which a 2D pattern has been applied, which, when the pattern is decoded, indicates the amount of displacement that the readhead has undergone relative to the surface. The scale pattern may include dark and bright areas, which correspond to a code which marks the displacement along the scale. The pattern of dark and light areas is decoded by the decoding circuit 250 into a pair of first resolution absolute position measurement values. The decoding circuit outputs these first resolution absolute position measurement values to the position accumulator 290 over a signal line 252.

Next, based on the predetermined portion or code portion located by the portion locating circuit 240, the controller 205 outputs control signals over the signal line 211 to the distance determining circuit 260. In response, the distance determining circuit 260 inputs the all or part of the obtained image including at least the reference location for the local datum, such as the edges of the obtained image and the portion of the obtained image which is required in order to determine the location of the local datum from the current image portion 232 of the memory 230. The distance determining circuit 260 then analyzes this input portion of the obtained image to determine the second resolution distance measurement values for the 2D position of the readhead relative to the 2D scale based on the distances of the local datum to the corresponding reference positions for the local datum. The distance determining circuit 260 outputs these second resolution distance measurement values over a signal line 262 to the position accumulator 290.

Then, the controller 205 outputs a signal on the signal line 209 to the comparing circuit 270 to implement the appropriate correlation techniques outlined above. In various exemplary embodiments, the various one-dimensional correlation curves or correlation function values for the appropriate offsets of the appropriate row and column portions are determined. Alternatively, various two-dimensional correlation functions or correlation function values for the appropriate offsets of the appropriate row and column portions are determined. Additionally, as indicated above with respect to operation related to an exemplary scale, correlation function values will be created by the controller 205 operating the comparing circuit 270 and the comparison result accumulator 275 in conjunction with the controller 205 operating the portion locating circuit to locate the appropriate row and column portions, as outlined above with respect to FIG. 8.

In response to the control signals from the controller 205 to generate a particular one of the one or more correlation curves or correlation function values to be generated for each appropriate axis, the comparing circuit 270 inputs an image value for a particular pixel from the pixel correlation area of the current image stored in the current image portion 232 over the signal line 238 and inputs the image value for the corresponding pixel, based on the current offset, from the appropriate reference image stored in the reference image portion 234 over the signal line 238. The comparing circuit 270 then applies a correlation algorithm to determine a comparison result. Any appropriate correlation technique, known or later-developed, can be used by the comparing circuit 220 to compare the current image stored in the current image portion 232 with the reference image stored in the reference image portion 234 on a pixel-by-pixel basis based on the current offset. The comparing circuit 270 outputs the comparison result on a signal line 272 to the comparison result accumulator 275 for the current correlation offset.

Once the comparing circuit 270 has extracted and compared the image value for each of the image elements 162 from the current image portion 232 for the particular correlation curve or correlation function values and compared them to the corresponding image values stored in the reference image portion 234, and applied the correlation technique and output the comparison result to the comparison result accumulator 275, the value stored in the comparison result accumulator 275 defines the correlation value, corresponding to the current 2D, or X or Y, offset, in predetermined units. The controller 205 then outputs a signal over the signal line 213 to the comparison result accumulator 275 and to the memory 230 over the signal line 208. As a result, the correlation value result stored in the comparison result accumulator 275 is output and stored in the correlation portion 236 of the memory 230 at a location corresponding to the current 2D, or X or Y, offset.

The controller 205 then outputs a signal on the signal line 213 to clear the result accumulator 275. Once all of the comparisons for all of the desired offsets between the current image stored in the current image portion 232 and the reference image stored in the reference image portion 234 have been performed by the comparing circuit 270, and the results accumulated by the comparison result accumulator 275 and stored in the correlation portion 236 under control of the controller 205, the controller 205 outputs a control signal over the signal line 214 to the interpolation circuit 280 and/or control signal over the signal lines 209 to the portion locating circuit 240.

The correlation results that are generated by the comparing circuit 270 and the comparison result accumulator 275, are stored in the correlation portion 236 of the memory 230 and are then output, under control of the controller 205, to the interpolation circuit 280. That is, the interpolation circuit 280 inputs the correlation results stored in the correlation portion 236 over the signal line 238 for the 2D correlation, and interpolates the correlation function to determine the peak offset value or image displacement value with sub-pixel resolution in the X and Y directions. The interpolation circuit 280 then outputs, under control of the signal over the signal line 214 from the controller 205, the determined subpixel third resolution measurement value on a signal line 282 to the position accumulator 290.

The interpolation circuit 280 uses any known or later developed technique, such as any one of the techniques disclosed in U.S. patent application Ser. No. 09/731,671 incorporated herein by reference in its entirety, to find the actual location of the selected peak of the correlation results to a subpixel resolution. This subpixel resolution incremental offset position information is output by the interpolation circuit 280 over the signal line 282 to the position accumulator 290.

The position accumulator 290 combines the position or distance measurement values output by each of the decoding circuit 250, the distance determining circuit 260 and interpolation circuit 280 to generate a third-resolution 2D absolute position measurement indicative of the position of the readhead relative to the scale. The position accumulator 290 outputs this 2D absolute position measurement to the controller 205 over the signal line 292. The controller 205 then outputs the determined absolute position measurement over a signal line 216 to a display driver 201. The display driver 201 drives a display (not shown) by outputting control signals over a signal line 202 to output the determined absolute position measurement.

In response, the controller 205 may output the updated 2D position values to the display driver 201, if provided, over the signal line 217. The display driver 201 then outputs drive signals over the signal line 202 to the display device 107 to display the current displacement value.

One or more signal lines 204, if provided, allow an interface between an operator or a cooperating system and the controller 210. If provided, the input interface 203 may buffer or transform the input signals or commands and transmit the appropriate signal to the controller 205.

While various exemplary embodiments have been illustrated and described, a wide variety of pixel address window sizes, pixel correlation area sizes and criteria for the selection of the pixel address window exists. Although various operations and features have been described with reference to a speckle optical displacement transducer or an absolute optical displacement transducer, the various operations and features described in relation to the embodiments herein may just as well be applied in various combinations with other detectors and transducers. For example, detector arrays mounted to spectrometers to receive the light diffracted by a grating may make take advantage of the disclosed benefits. Various modification and substitutions or the like are possible within the spirit and scope of the invention.

What is claimed is:

1. An apparatus for determining a high resolution surface displacement measurement relative to a target surface, the apparatus comprising:
    a light source arranged to project a beam of light onto the target surface;
    a detector arranged to receive light reflected from the target surface and configured to provide image data corresponding to the received light, wherein the detector has a number of pixels at least about 50% larger than a largest number of pixels that are included in a pixel address window that defines image data that is used by the apparatus for determining the high resolution surface displacement measurement;
    signal generating and processing circuitry operable to determine the high resolution surface displacement measurement, the signal generating and processing circuitry including a controller configured to determine the pixel address window and a memory including a pixel address window definition portion,
wherein:
    the controller is configured to determine the pixel address window such that the pixel address window consists of a subset of pixels on the detector which have the best or sufficient image intensity and uniformity characteristics;
    the signal generating and processing circuitry is configured to determine a pixel correlation area that has an area smaller than the pixel address window, and which defines a number of pixel elements that will overlap in two successive correlation images and participate in correlation calculations used determine the high resolution surface displacement measurement; and
    the signal generating and processing circuitry is configured to determine the high resolution surface displacement measurement based on the pixel correlation area and the image data defined by the pixel address window.

2. The apparatus of claim 1, further comprising:
    an illumination beam aperture located between a light emitting element of the light source and the target surface, wherein the illumination beam aperture is configured to block light from a beam profile output by the light emitting element such that only light from a central portion of the beam profile output by the light emitting element is included in the beam directed onto the target surface.

3. The apparatus of claim 1, wherein the signal generating and processing circuitry comprises a comparing circuit which performs a correlation calculation using the pixels in the correlation area.

4. The apparatus of claim 1 wherein the pixel address window has dimensions between about 200 and about 300 pixels on each side.

5. The apparatus of claim 1, wherein the light source is a source of coherent radiation, and the beam spot contains a speckle pattern in the light reflected from the target surface.

6. The apparatus of claim 1, wherein the light source is an incoherent light source, and the surface includes a scale pattern indicative of displacement.

7. The apparatus of claim 1, wherein the signal generating and processing circuitry is configured to determine a figure of merit for the pixels in the pixel address window, wherein the figure of merit is indicative of the best or sufficient image intensity and uniformity characteristics.

8. A method for operating an apparatus for determining a high resolution surface displacement measurement relative to a target surface, the apparatus comprising a light source; a detector that has a number of pixels at least 50% larger than a largest number of pixels that are included in a pixel address window that defines image data that is used for determining the high resolution surface displacement measurement; signal generating and processing circuitry operable to determine the high resolution surface displacement measurement, the signal generating and processing circuitry including a controller configured to determine the pixel address window and a memory including a pixel address window definition portion, wherein the method for operating the apparatus comprises:
    directing a beam of light from the light source onto the target surface;
    reflecting the beam from the target surface and into a beam spot on the detector;
    determining the pixel address window such that the pixel address window consists of a subset of pixels on the detector which have the best or sufficient image intensity and uniformity characteristics;
    determining a pixel correlation area that has an area smaller than the pixel address window, and which defines a number of pixel elements that will overlap in two successive correlation images and participate in correlation calculations used determine the high resolution surface displacement measurement; and
    determining the high resolution surface displacement measurement based on the pixel correlation area and the image data defined by the pixel address window.

9. The method of claim 8, further comprising:
    performing an interpolation to determine the high resolution surface displacement measurement.

10. The method of claim 8, wherein the pixel address window, contains between about 40000 and about 90000 pixels.

11. The method of claim 8, wherein the step of determining the pixel address window comprises determining a figure of merit indicative of the best or sufficient image intensity and uniformity characteristics.

12. The method of claim 8, wherein the detector has an area at least 4 times larger than the pixel address window.

13. The method of claim 8, wherein the pixel correlation area contains between about 10000 and about 22500 pixels.

14. The method of claim 8, wherein the apparatus further comprises an illumination beam aperture located between a light emitting element of the light source and the target surface and the method further comprises:

using the illumination beam aperture to blocks light from a beam profile output by the light emitting element such that only light from a central portion of the beam from the beam profile output by the light emitting element is included in the beam directed onto the target surface.

15. The method of claim 14, wherein the illumination beam aperture is used to block light all light from the beam profile that has an intensity that is less than about 80% of a maximum intensity of the beam profile.

16. The method of claim 8, further comprising:

decoding image data included in the pixel address window, the image data corresponding to a pattern applied to the target surface and illuminated by the beam that is directed onto the target surface, to determine a first resolution absolute position measurement value corresponding to position of the apparatus relative to the target surface.

* * * * *